United States Patent
Daniel

(10) Patent No.: US 9,178,862 B1
(45) Date of Patent: Nov. 3, 2015

(54) SYSTEM AND METHOD FOR CONVENIENT AND SECURE ELECTRONIC POSTMARKING USING AN ELECTRONIC POSTMARKING TERMINAL

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 93 days.

(21) Appl. No.: 14/083,395

(22) Filed: Nov. 18, 2013

Related U.S. Application Data

(60) Provisional application No. 61/727,584, filed on Nov. 16, 2012, provisional application No. 61/727,604, filed on Nov. 16, 2012.

(51) Int. Cl.
*H04L 29/06* (2006.01)

(52) U.S. Cl.
CPC ............ *H04L 63/08* (2013.01); *H04L 63/0428* (2013.01)

(58) Field of Classification Search
CPC .............................. H04L 63/08; H04L 63/0428
USPC ...................... 713/168, 176, 170, 183; 726/10
See application file for complete search history.

(56) References Cited

U.S. PATENT DOCUMENTS

| | | | | |
|---|---|---|---|---|
| 5,671,282 A * | 9/1997 | Wolff et al. | .................... | 713/179 |
| 5,757,916 A * | 5/1998 | MacDoran et al. | ............ | 380/258 |
| 5,796,841 A * | 8/1998 | Cordery et al. | ................. | 380/55 |
| 5,898,836 A * | 4/1999 | Freivald et al. | ............... | 709/218 |
| 6,282,565 B1 * | 8/2001 | Shaw et al. | .................... | 709/206 |
| 6,304,898 B1 * | 10/2001 | Shiigi | ........................... | 709/206 |
| 6,327,656 B2 * | 12/2001 | Zabetian | ....................... | 713/176 |
| 6,405,225 B1 * | 6/2002 | Apfel et al. | .................... | 715/210 |
| 6,499,665 B1 * | 12/2002 | Meunier et al. | ............... | 235/487 |
| 6,585,163 B1 * | 7/2003 | Meunier et al. | ............... | 235/487 |
| 6,640,301 B1 * | 10/2003 | Ng | ................................ | 713/156 |
| 6,650,890 B1 * | 11/2003 | Irlam et al. | ................. | 455/412.1 |
| 6,898,581 B1 * | 5/2005 | Cordery et al. | ............... | 705/400 |
| 6,947,556 B1 * | 9/2005 | Matyas et al. | .................. | 380/29 |
| 7,353,204 B2 * | 4/2008 | Liu | ................................ | 705/50 |
| 7,356,564 B2 * | 4/2008 | Hartselle et al. | ............. | 709/206 |
| 8,417,966 B1 * | 4/2013 | Mooneyham | ................. | 713/189 |
| 2001/0011350 A1 * | 8/2001 | Zabetian | ....................... | 713/176 |
| 2001/0037454 A1 * | 11/2001 | Botti et al. | ..................... | 713/176 |
| 2002/0004800 A1 * | 1/2002 | Kikuta et al. | ................. | 707/500 |
| 2002/0133396 A1 * | 9/2002 | Barnhart | ........................ | 705/12 |
| 2003/0012374 A1 * | 1/2003 | Wu et al. | ........................ | 380/44 |
| 2003/0026462 A1 * | 2/2003 | Chung et al. | .................. | 382/119 |
| 2003/0078880 A1 * | 4/2003 | Alley et al. | ..................... | 705/38 |
| 2003/0163552 A1 * | 8/2003 | Savitzky et al. | ............. | 709/219 |
| 2003/0233455 A1 * | 12/2003 | Leber et al. | .................... | 709/226 |
| 2004/0006692 A1 * | 1/2004 | Honda et al. | .................. | 713/157 |
| 2004/0092310 A1 * | 5/2004 | Brosnan et al. | ................ | 463/42 |
| 2005/0021963 A1 * | 1/2005 | Tomkow | ........................ | 713/171 |
| 2005/0022102 A1 * | 1/2005 | Gentry | .......................... | 715/500 |
| 2005/0038756 A1 * | 2/2005 | Nagel | .............................. | 705/76 |
| 2005/0138382 A1 * | 6/2005 | Hougaard et al. | ............ | 713/176 |
| 2006/0060649 A1 * | 3/2006 | Brucker et al. | ............... | 235/386 |

(Continued)

*Primary Examiner* — David Garcia Cervetti

(74) *Attorney, Agent, or Firm* — Alberto Interian, III, Esq.

(57) ABSTRACT

A method that includes using a user input device to allow a user to log-in to an e-mail account or user account, using the user input device to allow the user to enter an electronic message or select an electronic message, generating a first checksum based on the electronic message, transmitting the first checksum to a server, encrypting the electronic message, using a communications module to receive a unique postal identifier from a server and associate the unique postal identifier with the encrypted electronic message, and using a communications module to transmit the encrypted electronic message to a recipient client via a computer network.

22 Claims, 29 Drawing Sheets

(56) References Cited

U.S. PATENT DOCUMENTS

| | | | |
|---|---|---|---|
| 2006/0212711 A1* | 9/2006 | Tanimoto | 713/178 |
| 2007/0033254 A1* | 2/2007 | AlHusseini et al. | 709/205 |
| 2007/0033283 A1* | 2/2007 | Brown | 709/226 |
| 2007/0100913 A1* | 5/2007 | Sumner et al. | 707/204 |
| 2007/0143619 A1* | 6/2007 | Goodman et al. | 713/176 |
| 2007/0174402 A1* | 7/2007 | Tomkow | 709/206 |
| 2007/0269041 A1* | 11/2007 | Bhatnagar et al. | 380/30 |
| 2007/0288904 A1* | 12/2007 | Newcomb | 717/126 |
| 2008/0307222 A1* | 12/2008 | Chow et al. | 713/156 |
| 2008/0307226 A1* | 12/2008 | Chow et al. | 713/175 |
| 2009/0032591 A1* | 2/2009 | Cordery et al. | 235/386 |
| 2009/0132821 A1* | 5/2009 | Matsuzaki | 713/170 |
| 2009/0179071 A1* | 7/2009 | Backert et al. | 235/51 |
| 2009/0182876 A1* | 7/2009 | Hayashi | 709/225 |
| 2009/0187764 A1* | 7/2009 | Astakhov et al. | 713/170 |
| 2009/0210708 A1* | 8/2009 | Chou | 713/170 |
| 2009/0307302 A1* | 12/2009 | Tennant et al. | 709/203 |
| 2010/0011282 A1* | 1/2010 | Dollard et al. | 715/233 |
| 2010/0057750 A1* | 3/2010 | Aasted et al. | 707/10 |
| 2010/0131359 A1* | 5/2010 | Ting et al. | 705/14.47 |
| 2010/0146274 A1* | 6/2010 | Naslund et al. | 713/168 |
| 2010/0161993 A1* | 6/2010 | Mayer | 713/178 |
| 2010/0281257 A1* | 11/2010 | Yamazaki et al. | 713/168 |
| 2011/0053559 A1* | 3/2011 | Klein | 455/411 |
| 2011/0161674 A1* | 6/2011 | Ming | 713/181 |
| 2012/0137121 A1* | 5/2012 | Sherkin et al. | 713/150 |
| 2012/0192250 A1* | 7/2012 | Rakan | 726/2 |
| 2012/0330731 A1* | 12/2012 | Wagoner et al. | 705/12 |
| 2013/0268754 A1* | 10/2013 | Baltes et al. | 713/156 |
| 2014/0181933 A1* | 6/2014 | Sanjeev et al. | 726/7 |

\* cited by examiner

SYSTEM AND METHOD FOR CONVENIENT AND SECURE ELECTRONIC POSTMARKING USING AN ELECTRONIC POSTMARKING TERMINAL

PRIORITY CLAIM

This patent application is a Non-Provisional patent application and claims priority under 35 U.S.C. 119(e) to U.S. Provisional Patent Application Ser. No. 61/727,584, titled "System and Method for Convenient and Secure Electronic Postmarking Using an Electronic Postmarking Terminal," filed Nov. 16, 2012; and U.S. Provisional Patent Application Ser. No. 61/727,604, titled "Automatic Transmission Mobile Post Office System," filed Nov. 16, 2012. The entire disclosures of the afore-mentioned patent applications are incorporated by reference as if fully stated herein.

FIELD OF THE INVENTION

The present disclosure relates generally to electronic systems and methods, and more particularly, to systems, methods, and various other disclosures related to a mobile post office system for sending and receiving postal mail and e-mail, and other postal services, and third party certifying agency authenticating secure transmission of e-mail.

BACKGROUND OF THE INVENTION

Most communications are transmitted electronically by email. However, many search engines and other applications engage in data mining, crawling and saving cookies derived from the emails. Therefore, a sender can never be absolutely sure that the email transmitted was never reviewed, by another. Further, the law has not yet imposed sanctions and limitations for such offenses to data privacy. Thus it would be helpful to be able to certify that an email was transmitted to the intended sender without any unauthorized viewing and have a certifying agency certify that the electronic mail, such that any unauthorized viewing, data mining, tampering, crawling or other unauthorized review can be criminally or civilly sanctioned.

Furthermore, existing electronic postmarking systems work operate in confusing and complicated ways, which lay users find difficult to understand.

Yet another issue that users face these days are issues with e-mail privacy. Federal laws prohibit accessing or otherwise tampering with electronic communications, however once those communications have been stored for over 180 days, the prohibition no longer applies, and thus, employees of e-mail service providers can access users' emails thereby violating their privacy. Furthermore, many people disregard the Federal laws altogether and access user e-mails without consent. Many users also do not want e-mail service providers data mining the contents of their e-mails, which service providers sometimes use to provide customized ads.

The system and methods described herein satisfies these long felt needs in a new and novel manner.

SUMMARY OF THE INVENTION

The following system and methods result from the realizations that composing, sending, and receiving both physical and electronic correspondence may be made more efficient and easier by providing various embodiments of systems, methods for the convenient and secure composition, transmission, and receipt of electronic and physical messages, including e-mail, documents, audio and video messages.

DETAILED DESCRIPTION OF PREFERRED EMBODIMENTS

Figure 1:
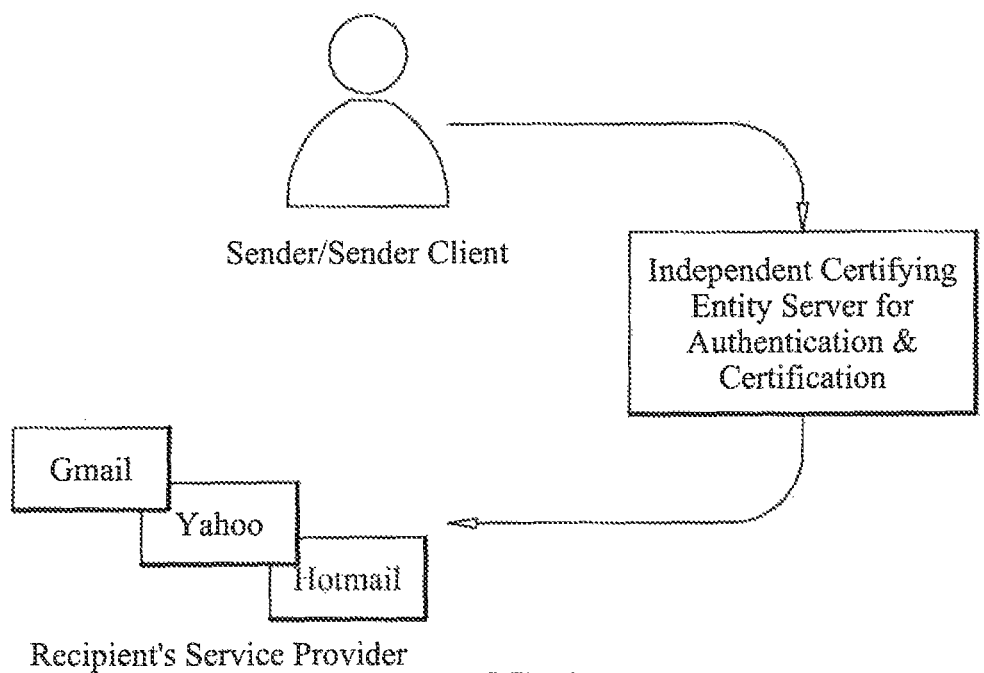
FIG. 1 shows an overview of a system in accordance with one embodiment.
Figure 2:
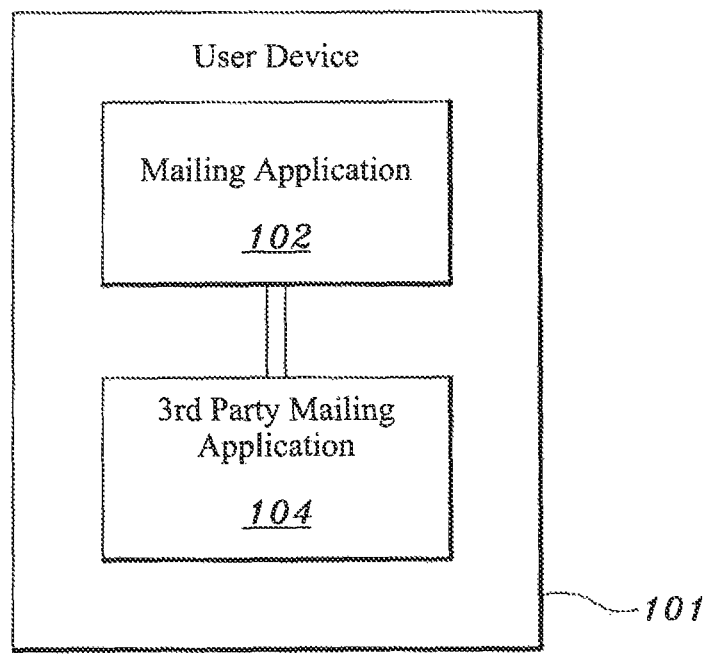
FIG. 2 shows a block diagram depicting a user device in accordance with one embodiment.
Figure 3A:
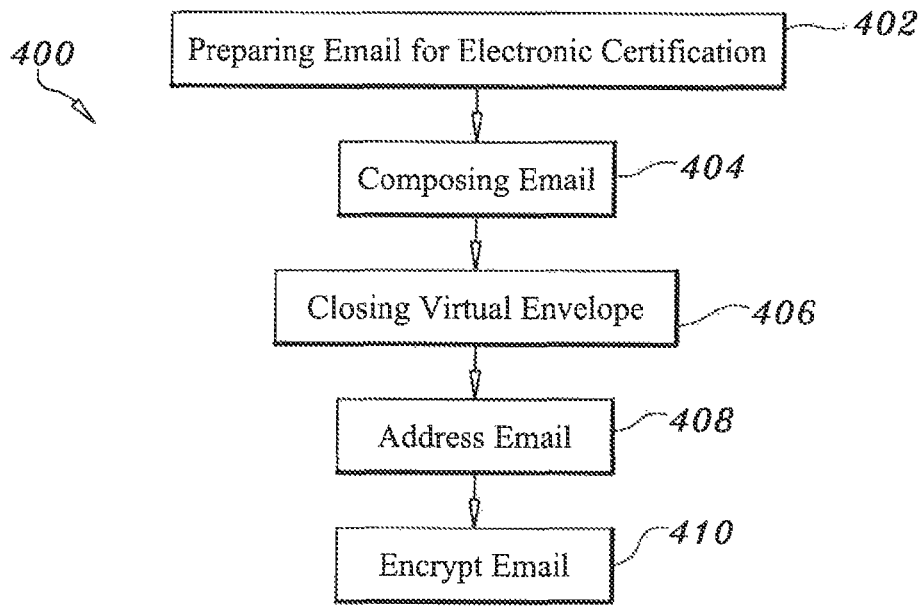
FIG. 3A shows a block diagram depicting a method in accordance with one embodiment.
Figure 3B:
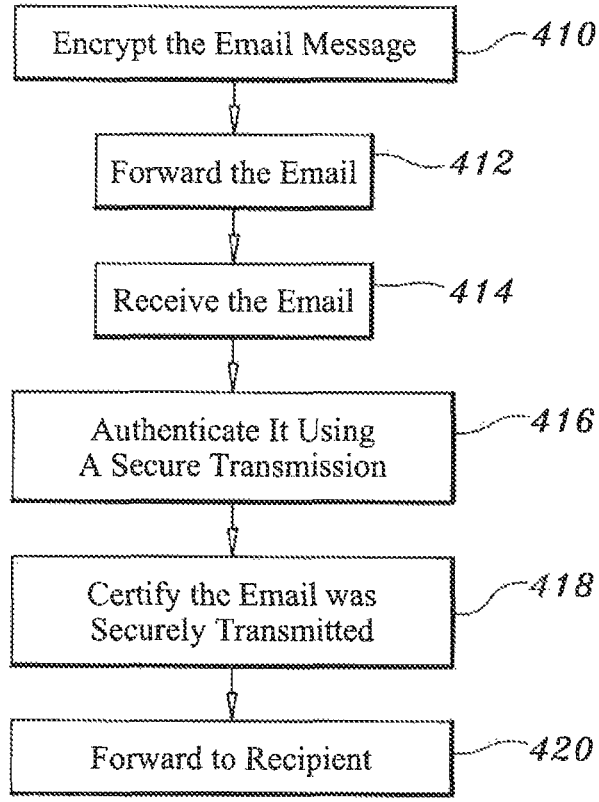
FIG. 3B shows a block diagram depicting a method in accordance with another embodiment.

FIGS. 1-3B show a brief introduction of the system 100 and method 400 in accordance with one embodiment, including various system diagrams, user interfaces, and flow charts associated with the systems and methods. The system 100 and method 400 disclosed herein includes an electronic mailing application 102 that operates as an attachment to third party electronic mail application 104 e.g. OUTLOOK, wherein a user has the option of selecting the type of electronic mail 106 being transmitted, e.g. regular or large layout. The application 104 allows the user to use a clickable icon 106 to open a virtual envelope 108, compose the electronic mail 110, address and seal the electronic mail 110 within the virtual envelope 108 for which an electronic seal 112 is added. Once the envelope 108 is electronically sealed, the system 100 encrypts the electronic mail 110 enclosed within, takes note of the sender and recipient's addresses 114, 114' and forwards the mail 110 to an independent certifying entity's computer server 116, equipped with a processor 118 and computer executable instructions 120 configured for executing all the necessary functions disclosed herein.

In some embodiments of the system 100 and methods 400 disclosed herein, the sender is not charged for the service.

In some embodiments of the system 100 and methods 400 disclosed herein, the sender is invoiced for the electronic certification with the electronic seal 112 and the cost is dependent on the size of the electronic mail 110 being transmitted, e.g. the larger SEMPOST electronic mail 110 costing more than the regular size.

In some embodiments, the sender may avail itself of postage approved by an authorized agency for the transmission of the email using the system 100 and methods 400 disclosed herein.

In either embodiment, the SEMPOST electronic mail 110 is forwarded to an independent certifying entity's server 116 whose computer executable instructions 120 is configured for authenticating that the email 110 as transmitted and received by the independent certifying entity's server 116 has not been tampered with, e.g. opened or reviewed by any unauthorized viewers. The authenticating process may include a review of the email 110 trail and applying a certifying stamp 122 to the email 110 that is being transmitted to the original intended recipient's email address 116. The independent certifying entity's server 116 will log the date and time that the email was received from the sender 116 and the time of the authenticating of the secured transmission of the email 110. As such, the sender may review their account or the stored records of the independent certifying entity's server 116 to confirm the receipt of the secured email 110 by the server 116 and the transmission of the email 110 to the recipient's email service provider.

In some embodiments, the email 110 arrives at the recipient's email provider in an encrypted format for which the recipient 116 will need the electronic mailing application 102 to decrypt the received email 110 in order to read and review the same. In this manner in the event that the recipient does not have the electronic mailing application 102, he/she will be unable to read the encrypted email 110 that has been encrypted by military standards, e.g. AES 256 bit encryption.

In some embodiments, the email 110 being transmitted cannot be forwarded without the sender's permission as via the system 100 and method disclosed herein, in an exemplary embodiment, the sender's passcode would be required to forward the email 110 to an unintended recipient 116 by the original sender.

In some embodiments, the email 110 being transmitted to an intended recipient if it is opened by an unauthorized viewer the email deletes itself. In some embodiments, the email 110 being transmitted to an intended recipient once opened by the recipient and closed, no secondary viewing is allowed by anyone else as the email may self-delete.

Referring now to FIGS. 4A-4G, which show an exemplary step 402 of method 400 of preparing an electronic mail 110 for electronic certification. In some embodiments, the SEMPOST application 102 is an add-on to an electronic mail application 104, and is accessible via a clickable icon 106. By clicking the activation icon 106, the user can activate the SEMPOST application 102 to open a virtual envelope 108 with a composition area 114 for composition of the electronic mail 110. In some embodiments, the SEMPOST electronic mail 110 is organized and displayable separate and apart from other general electronic mail 110'. In other embodiments, the SEMPOST electronic mail 110 is organized and displayed with other electronic mail 110' from a third party electronic mail application 104.

Figure 4A:
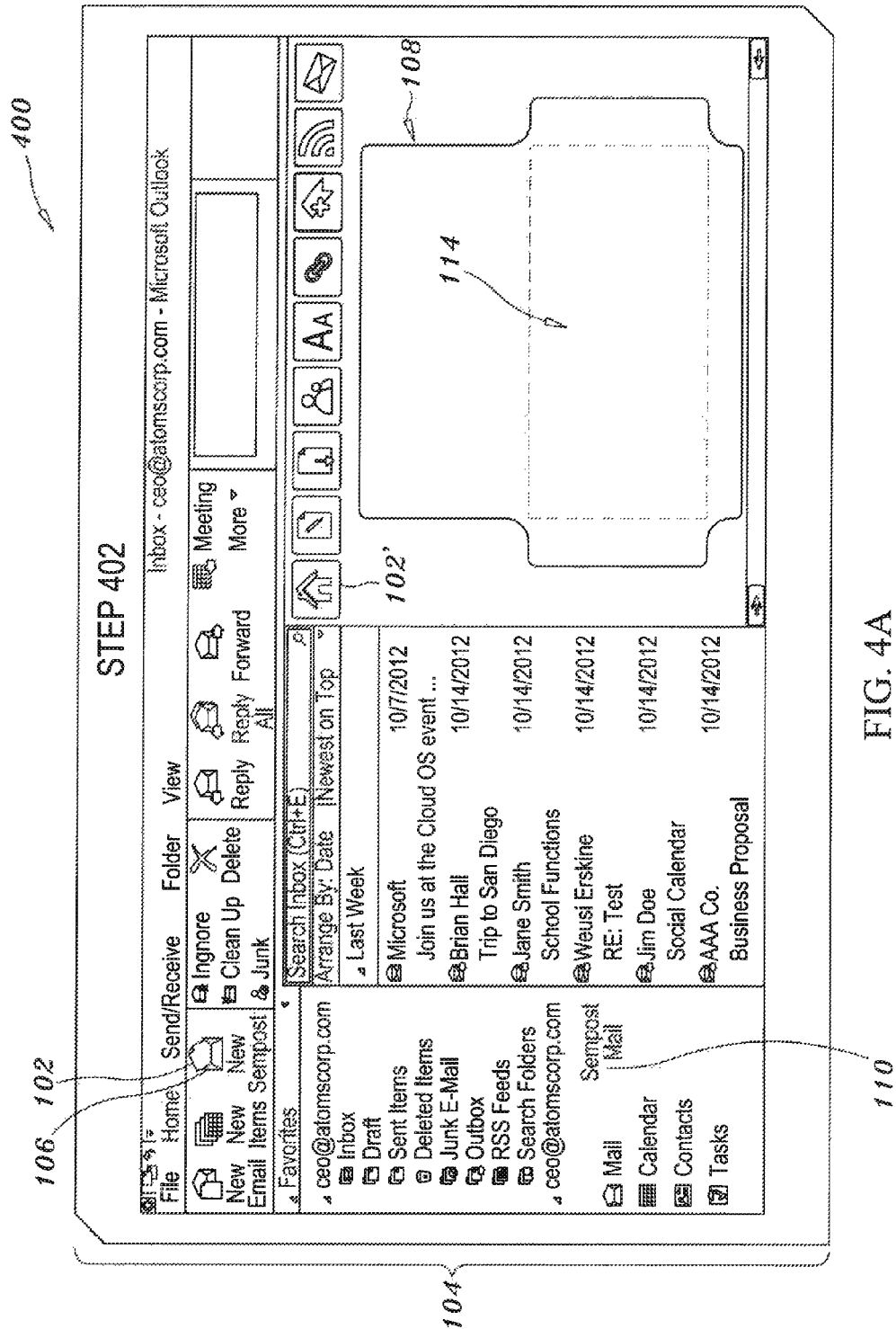
FIGS. 4A-4G show various steps of a method in accordance with one embodiment.
Figure 4B:
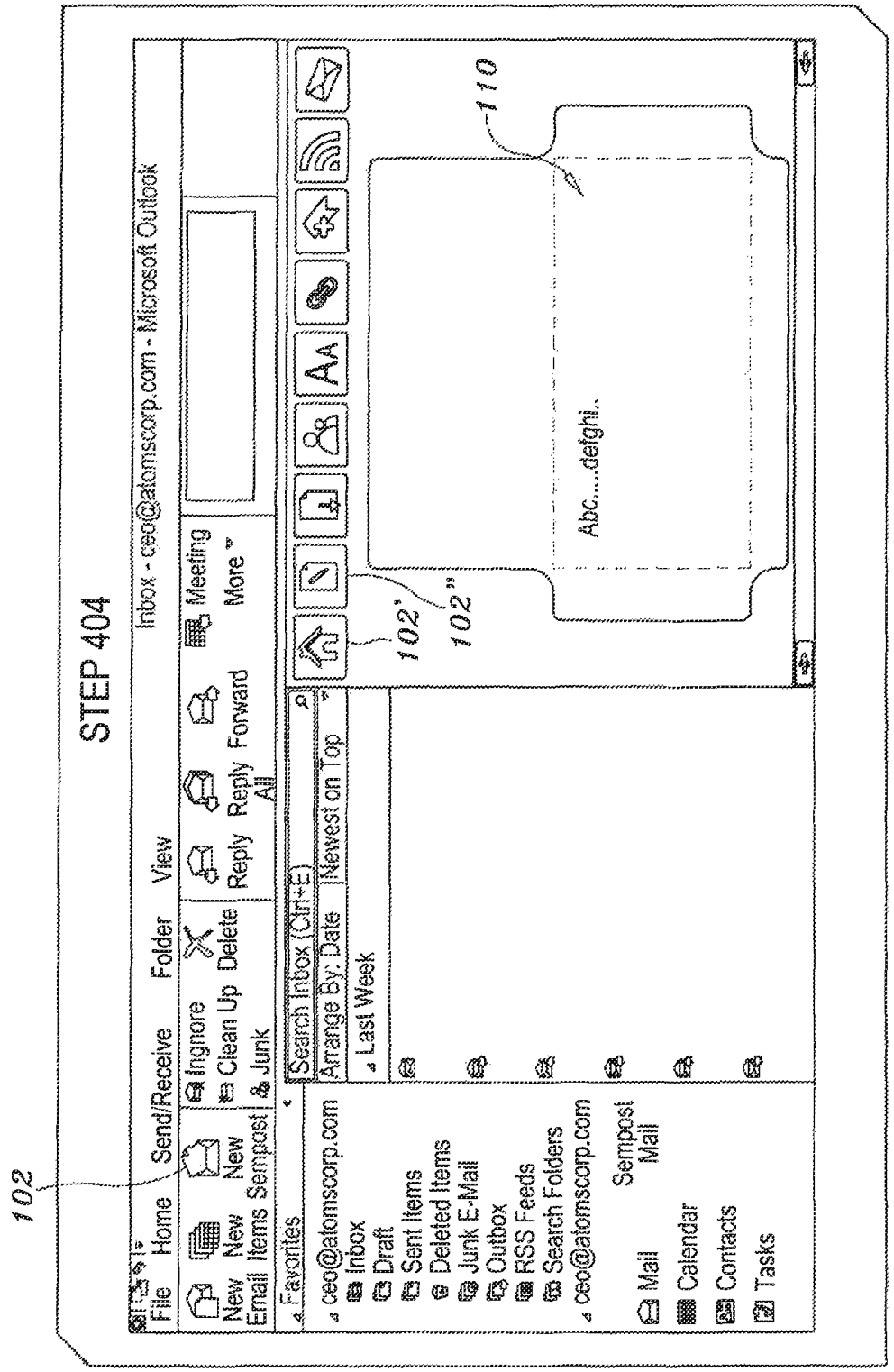
Figure 4C:
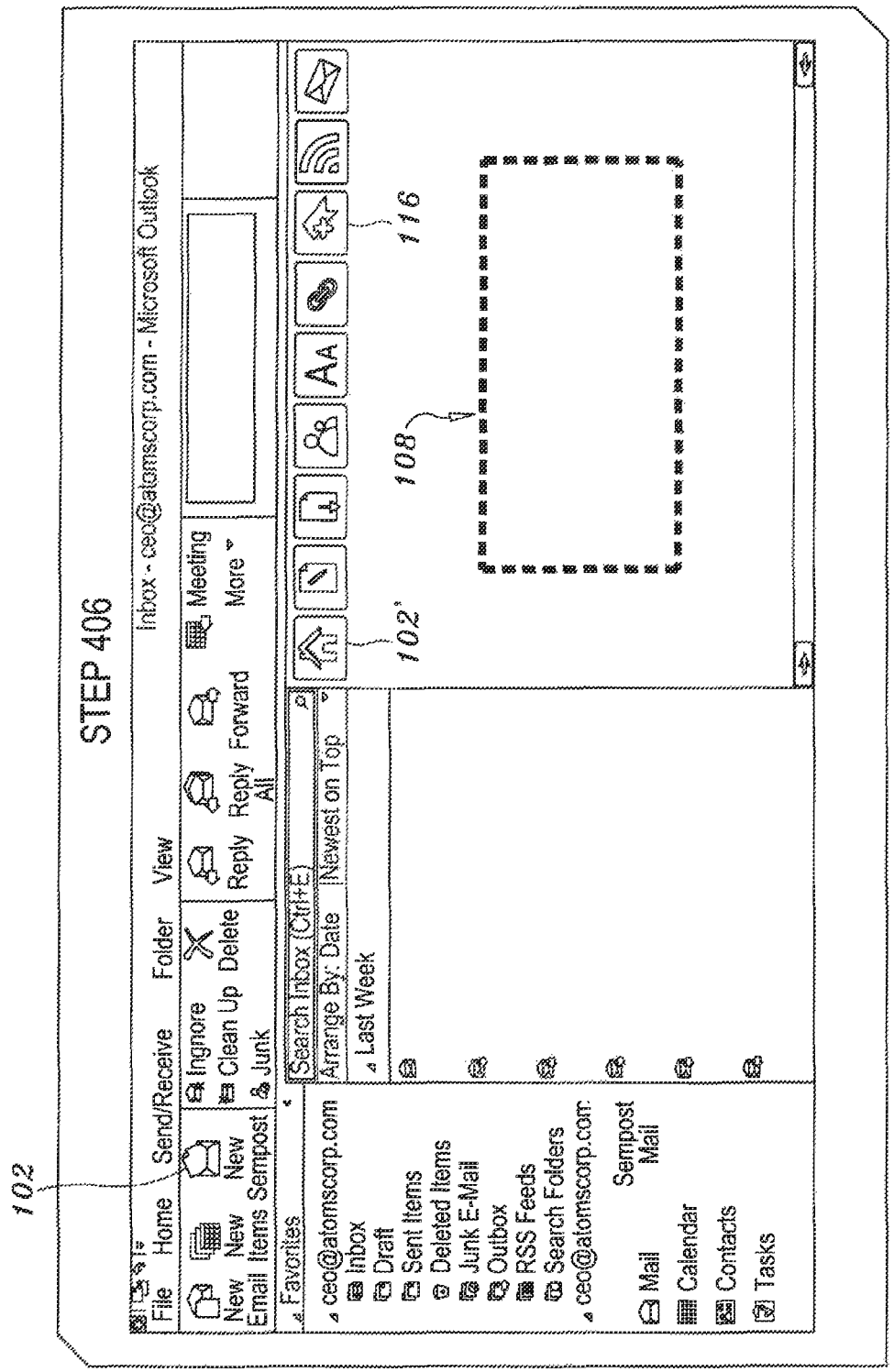

As shown in step 404 of FIG. 4B, once the icon 106" for composing the email is clicked, the user may compose the electronic mail 110 for transmission and click a closing icon 106 to seal the virtual envelope 112. FIG. 4C, step 406 shows the step of electronically closing the virtual envelope 108 with the electronic mail 110 enclosed within. The motion graphic may display the envelope virtually closing and ready to be processed for addressing. If an attachment needs to be added, the user has the ability to click the relevant attachment icon 116 for the attachment to be included. Once the virtual envelope 108 is closed, it will need to be addressed.

Figure 4D:
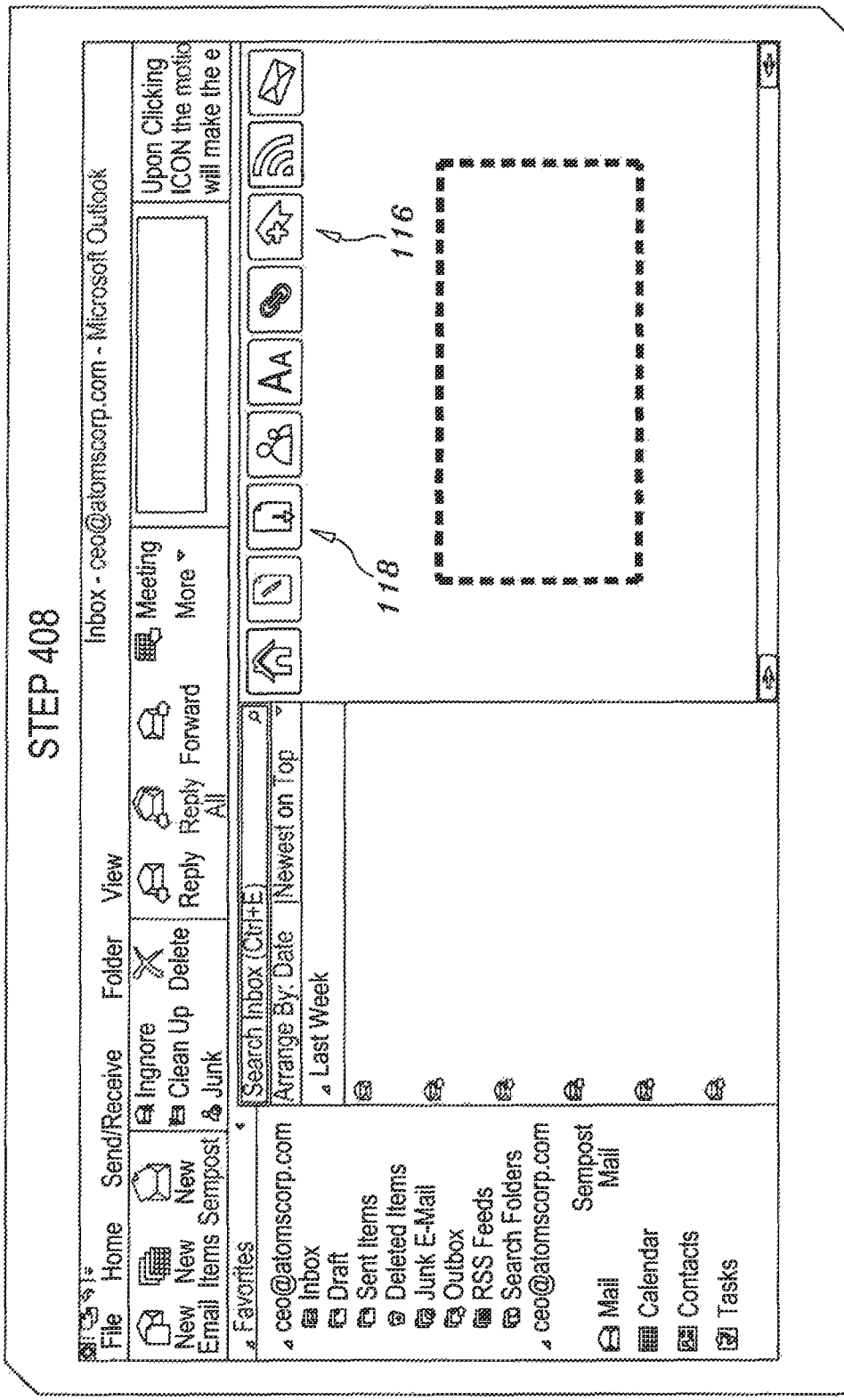
Figure 4E:
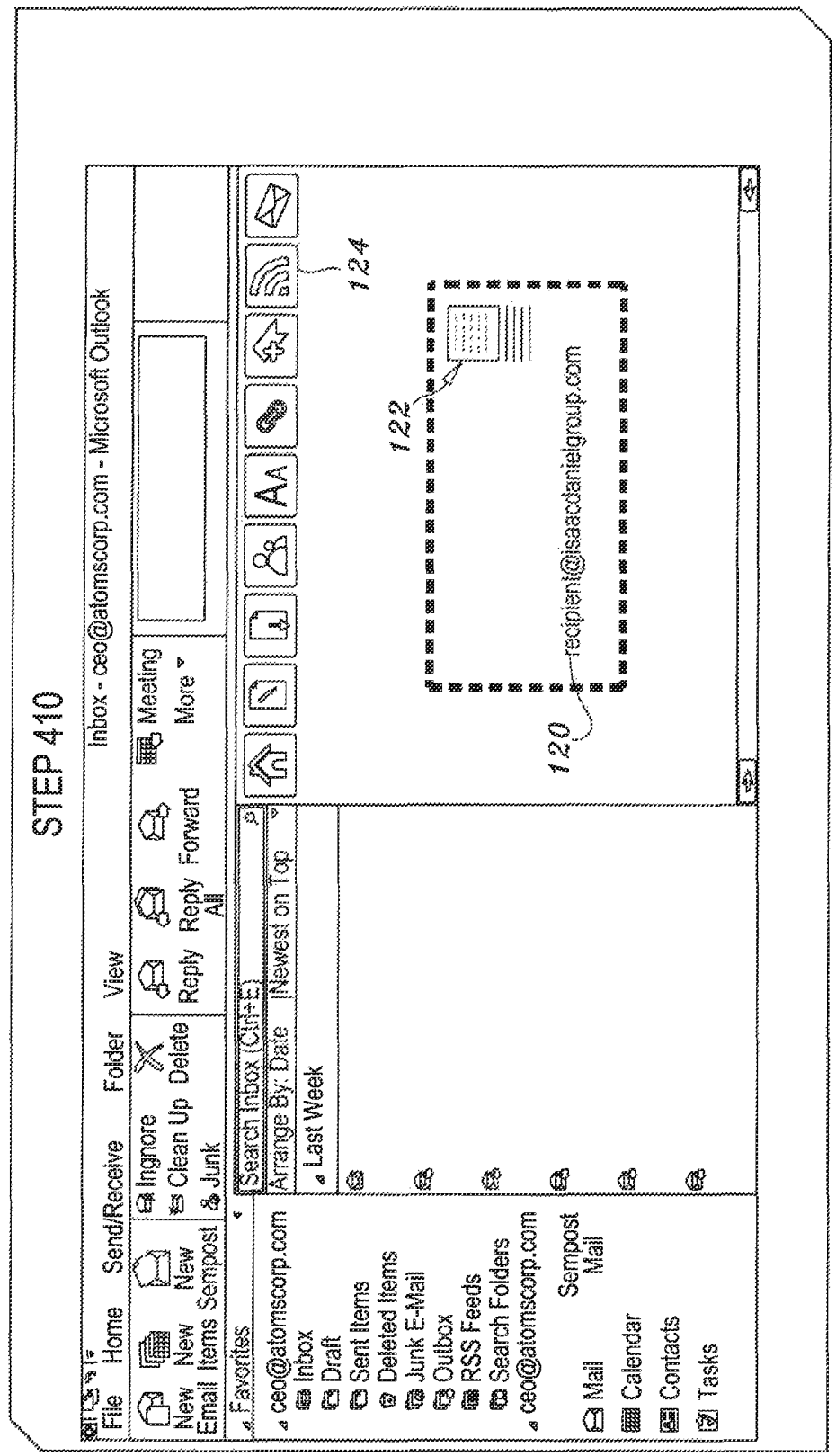

As shown in FIGS. 4D & 4E, steps 408 & 410, respectively, user may click the address icon 106 for which the system 100 receives the instruction and display the virtual envelope 112 being flipped for the email address 120 to be added as shown in FIG. 4E. As previously discussed, the system 100 encrypts the email 110 for transmission to the message recipient step 410). Once the email 110 is encrypted it is forwarded to the independent certifying entity's server 116 (step 412) which receives the email 110 (step 414), authenticates the email as secure transmission (step 416), certify that the email 110 was securely transmitted (step 418) and then forward the email 110 to the intended recipient (step 420).

Accordingly, with the certification intact, the recipient of the electronic mail 110 can be assured upon receipt that the privacy remained intact during the transmission process, whereby no data mining, crawling or farming for cookies and the like occurred. In some embodiments, if the virtual envelope 112 is mis-delivered the third party certifying agency does not get paid since the private communications were not received and worse, mis-delivered to an unintended recipient.

Figure 4F:
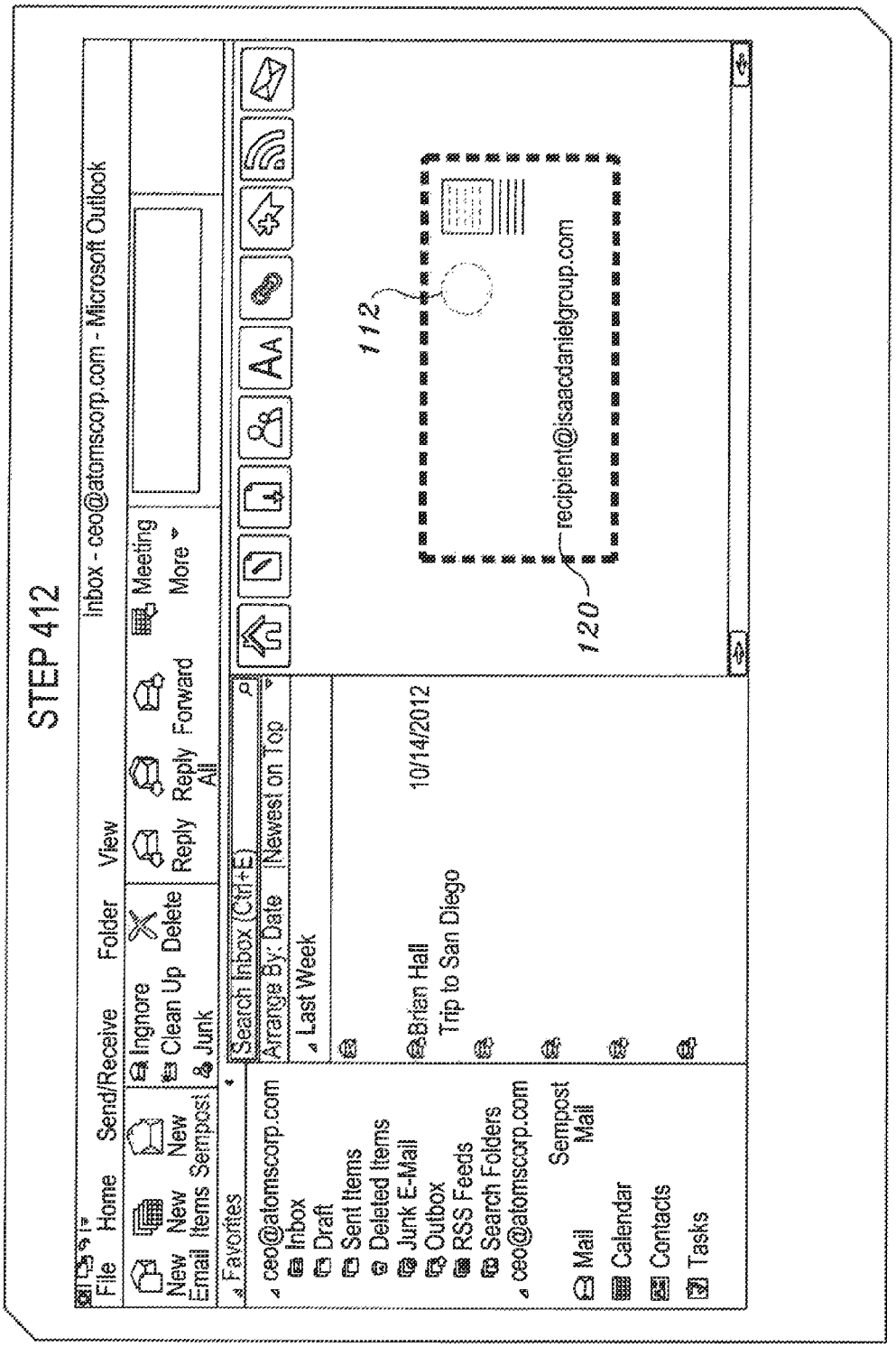
Figure 4G:
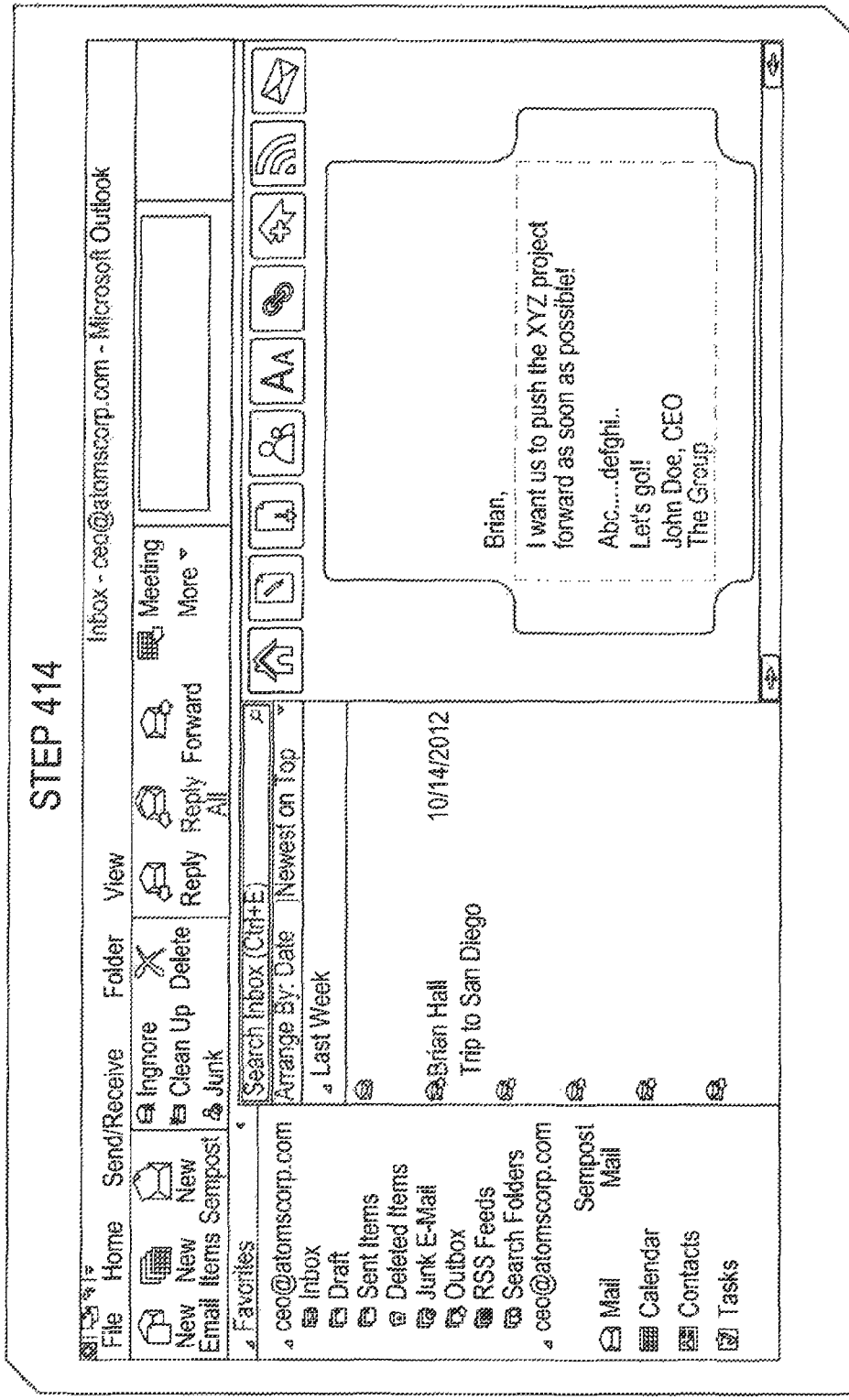

As seen in FIG. 4F, the third party electronic mail application 104 will display the received certified electronic mail 110 for review and once received, the intended recipient may open the electronic mail 110 for review and response as shown in FIG. 4G.

Figure 5:
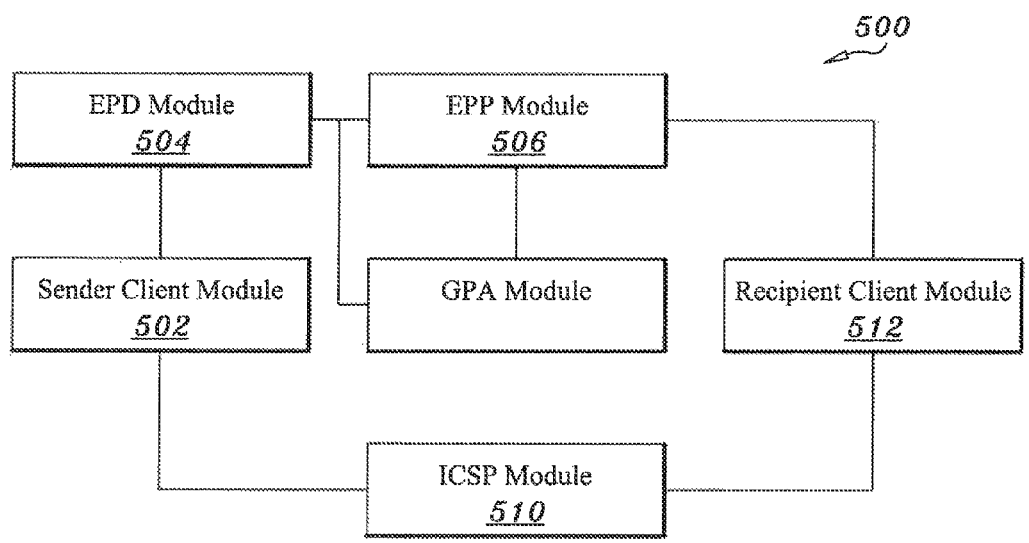
FIG. 5 shows a block diagram depicting a system in accordance with one embodiment.

Referring now to FIG. 5, a system 500 for convenient and secure electronic postmarking is shown in accordance with one embodiment, wherein system 500 comprises a sender client module 502, an electronic postmark depository ("EPD") module 504, an electronic postmark provider ("EPP") module 506, a governmental postal authority ("GPA") module 508, an internet communications service provider ("ICSP") module 510, and a recipient client module 512.

In some embodiments, sender client module 502 is operative to send a request to register or to pay for an electronic postmark to EPP module 506, EPP module 506 is then operative to request a license from the GPA module 508 to apply an electronic postmark to an e-mail for sender client module 502, obtain an electronic postmark from EPD module 504, and transmit or apply an electronic post mark to an e-mail to be sent by sender client module 502. After receiving an electronic postmark from EPP module 506, sender client module 502 is then operative to send the postmarked e-mail to recipient client module 512 via ICSP module 510.

In another embodiment, sender client module 502 may comprise a scanner, printer, or photocopier module, wherein sender client module 502 may be operative to use the scanner, printer, or photocopier module to scan at least one physical document and convert it into a digital document, include the digital document in an e-mail, and then undertake the digital/electronic franking/postmarking of the digital document/e-mail. In another embodiment, sender client module may be operative to scan physical documents, and automatically convert them to digital documents and send them to a designated recipient client module(s) an electronic postmarked e-mail. In yet another embodiment, the scanner module may be operative to scan documents and automatically e-mail them as a postmarked attachment. Users may designate recipients and pay for postage on the scanner module.

In some embodiments, ICSP module 510 may comprise any type of internet communications service provider module, such as an e-mail service provider module, an internet service provider module, and the like.

Upon receipt of the postmarked e-mail by recipient client module 512, EPP module 506 may be operative to send a receipt to sender client module 502.

In some embodiments, the various communications mentioned above may be achieved through using a computer network, such as a local area network, or a wide area network, such as a world wide web. Accordingly, the various module may be connected to each other directly or via a computer network.

In some embodiments, EPD module 504 may comprise a digital franking or stamping module, such as a software module, a payment processing system, and the like.

In one embodiment, GPA module 508 may comprise any type of governmental postal authority, such as a governmental postal service, such as the United States Postal Service. In another embodiment, the GPA module 508 may comprise a global GPA module or a foreign GPA module.

Any or all of the EPD module 504, ICSP module 510, EPP module 506, GPA module 508 may comprise at least one server.

Referring now to FIGS. 6A-6D, a convenient system 600 for electronic postmarking is shown wherein system 600 may be operative to operate on sender client module 502 and/or recipient client module 512, and wherein system 600 may comprise a processor 602, a display device 604 electronically connected to processor 602, and computer executable instructions 606 readable by processor 602 and operative to use display device 604 to display at least one window 608 featuring at least one edit message button 610 operative to allow at least one sender to edit a message, one contacts button 612 to allow the sender to choose recipient(s) from a contact list, at least one add attachments button 614 to allow a sender to attach a file, at least one flip envelope button 616 to allow a sender to flip a virtual envelope 624 and reveal to/from addresses on the envelope, at least one apply stamp button 618 to allow a sender to apply an electronic postmark 626 to an e-mail and display a virtual stamp on the virtual envelope 624, at least one close envelope button 620 to allow a sender to close envelope 624 (and thereby prevent any further editing or changing to email or letter) and thereby encrypting the message, and at least one send button 622 to allow a sender to send the email. In some embodiments, the computer executable instructions may require a user to perform the functions associated with buttons 610-622 in the order set forth above or shown in FIG. 6B. In some embodiments, a secure e-mail application may run as an attachment or plug-in to a standard e-mail application, wherein the standard e-mail application may include a user selectable virtual tab or icon to access the secure e-mail application, and perform the various functions set forth above, such as reading, opening, accessing, composing, and sending the secure e-mail messages.

Figure 6A:
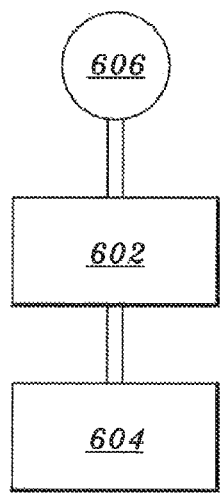
FIG. 6A shows a block diagram depicting a system in accordance with another embodiment.
Figure 6B:
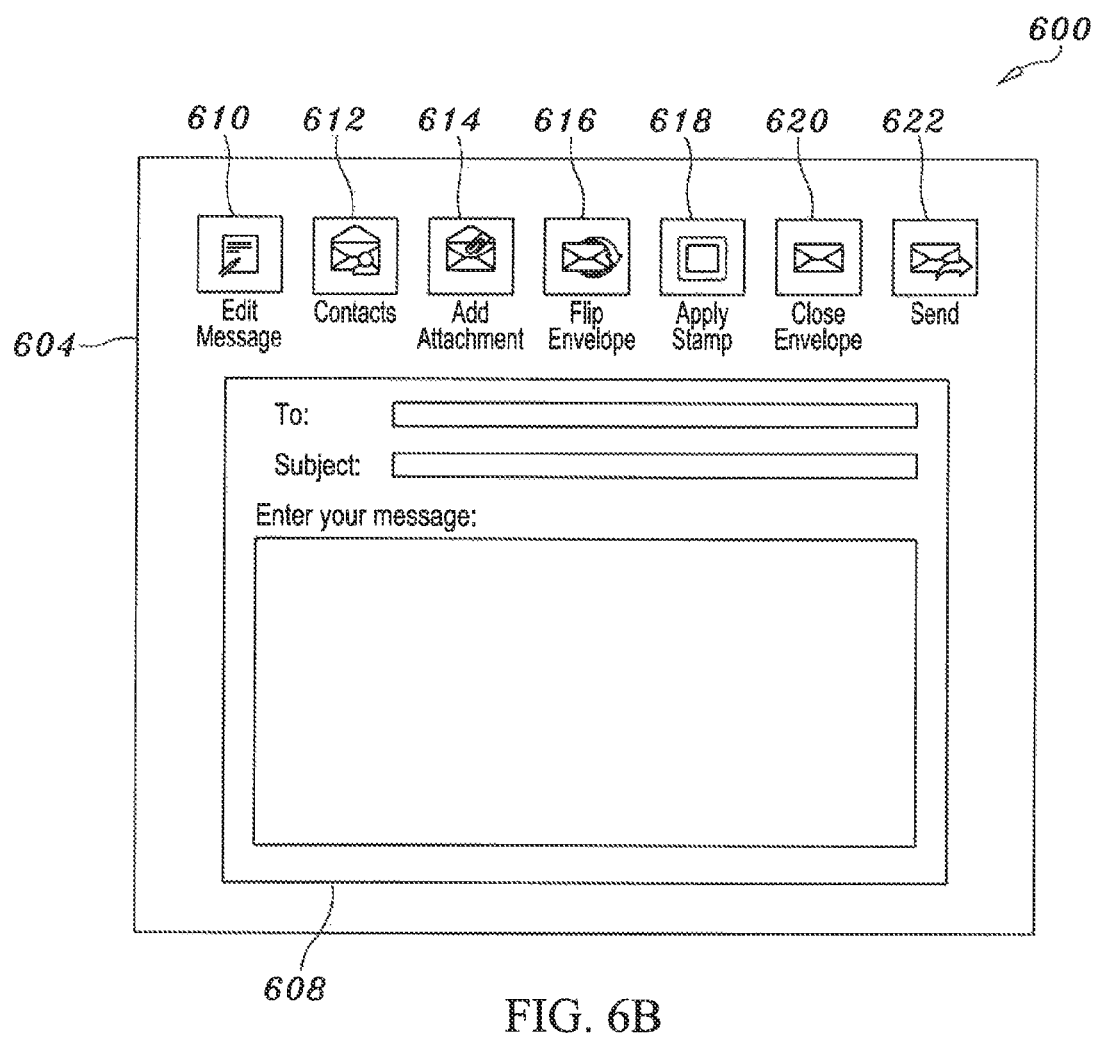
FIG. 6B shows a display device displaying a user interface in accordance with one embodiment.
Figure 6C:
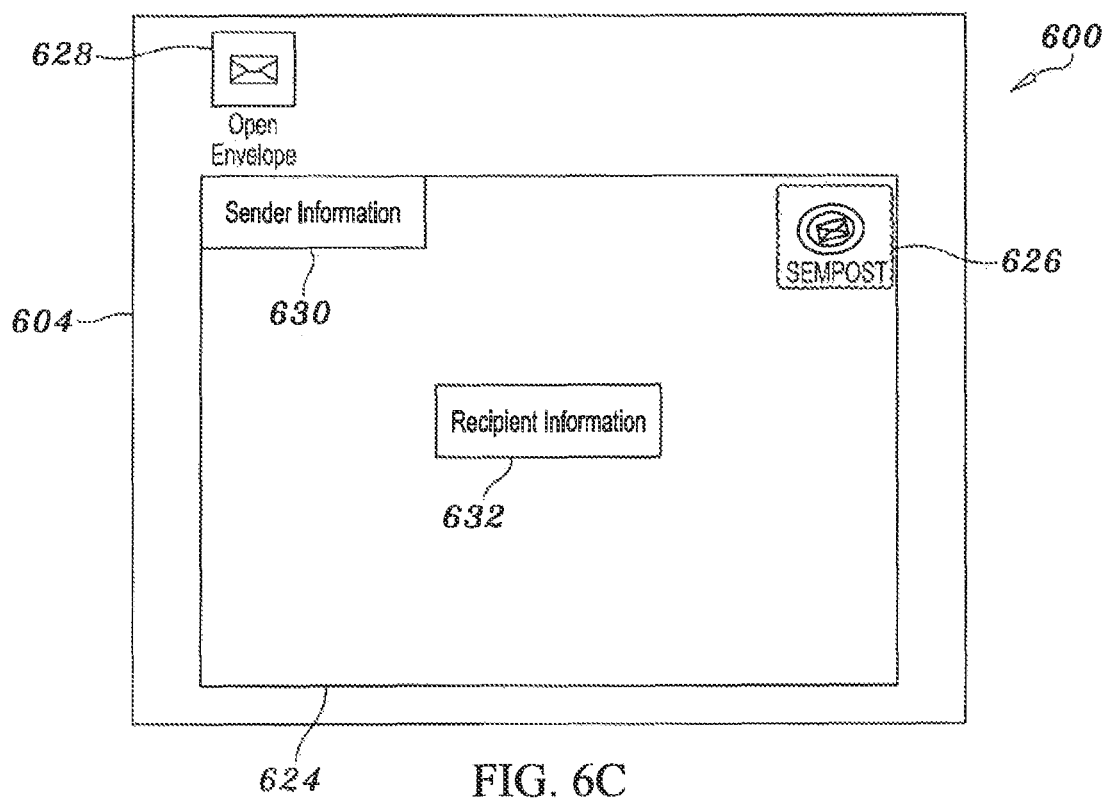
FIG. 6C shows a display device displaying a user interface in accordance with another embodiment.
Figure 6D:
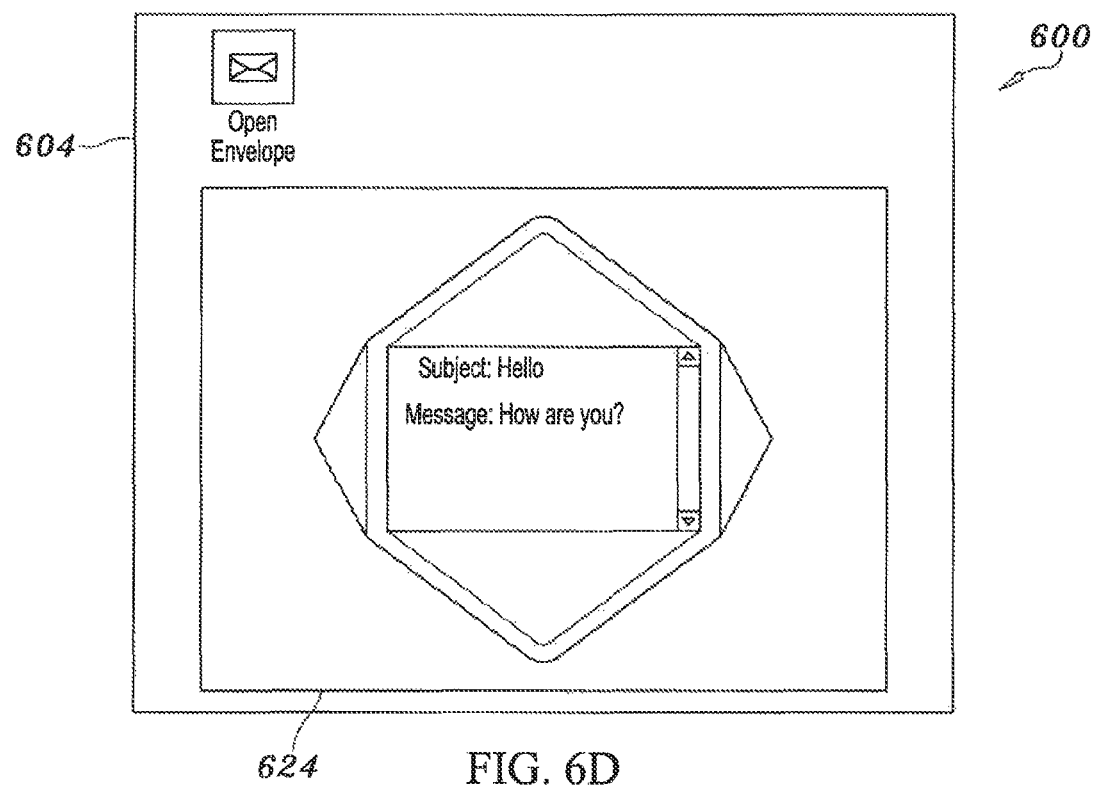
FIG. 6D shows a display device displaying a user interface in accordance with yet another embodiment.

In another embodiment, computer executable instructions 606 may be operative to use display device 604 to display at least one open envelope button 628 to allow at least one recipient to open envelope 624 (and therefore open the e-mail), wherein upon opening the envelope the recipient is shown the contents of the e-mail. The e-mail may be encrypted when received and may be decrypted when opened. Regarding FIG. 6C, a closed envelope is shown, whereas FIG. 6D shows an open envelope.

In some embodiments, computer executable instructions 606 may be operative to display the sender's name/address 630 and/or the recipient's name/address on envelope 624.

Figure 7A:
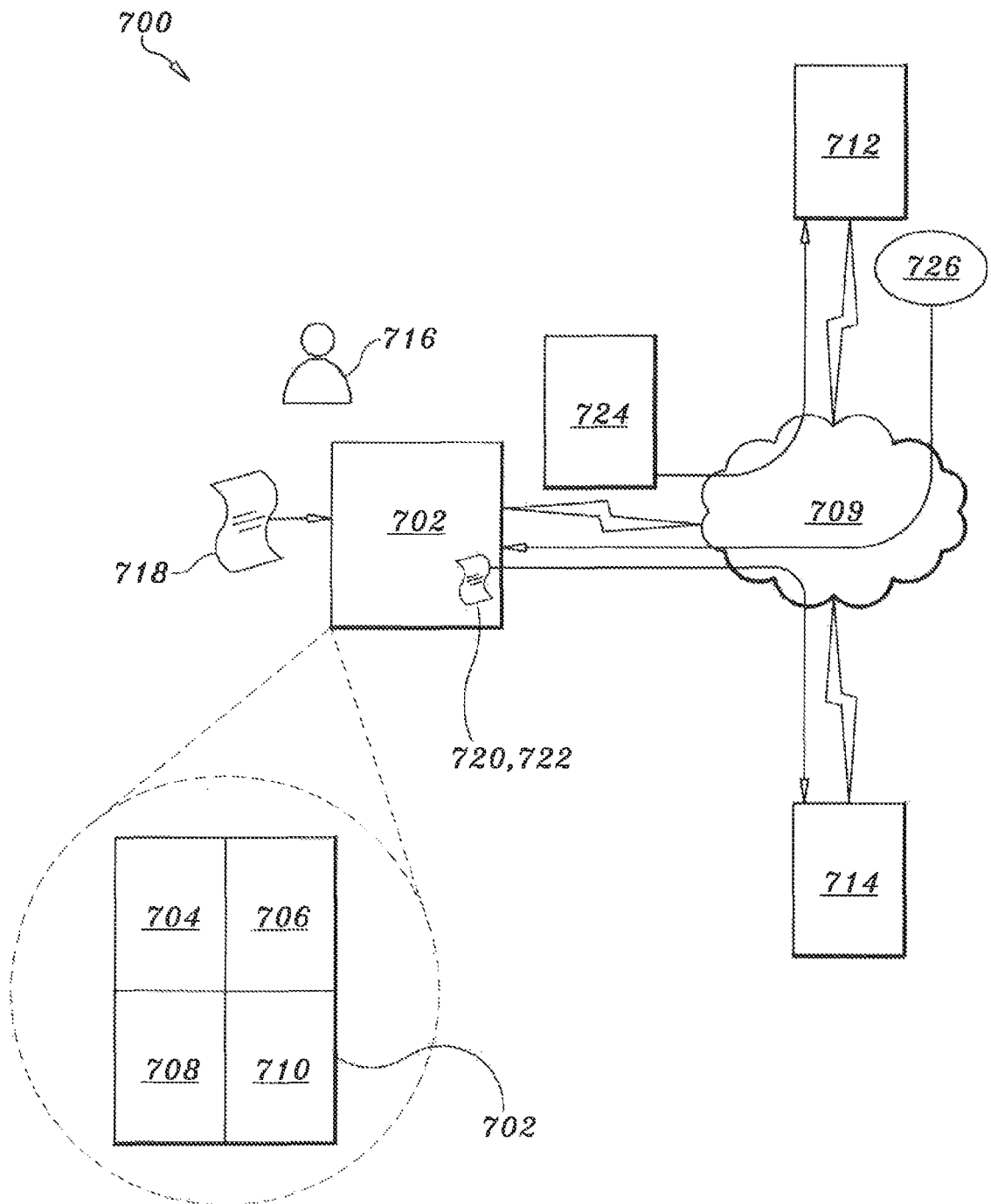
FIG. 7A shows a block diagram depicting a system in accordance with one embodiment.
Figure 7B:
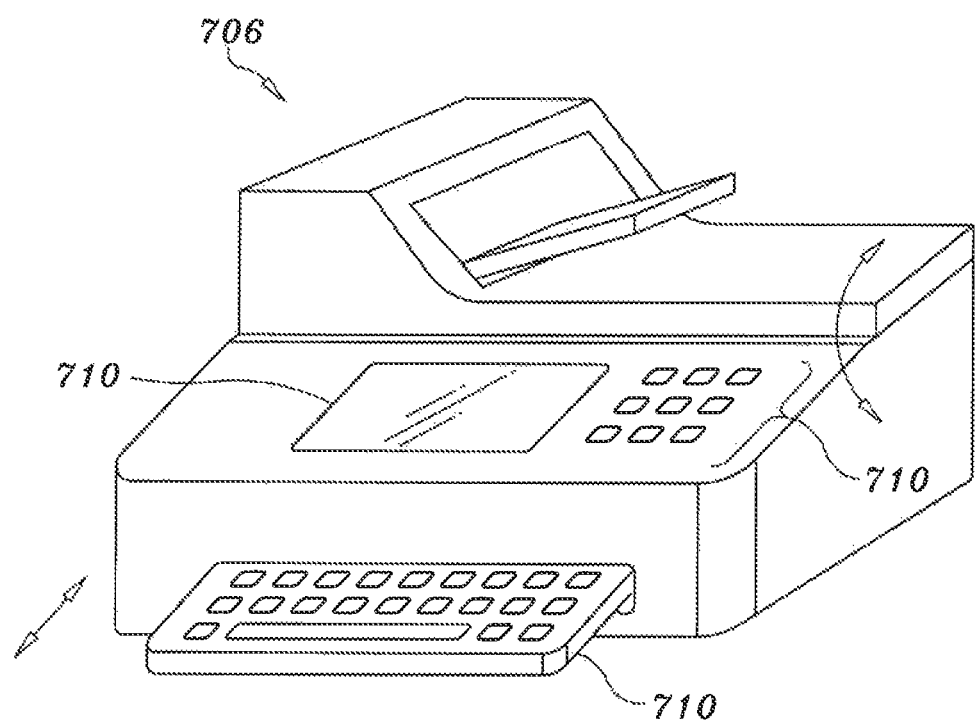
FIG. 7B shows a system in accordance with another embodiment.

Referring now to FIGS. 7A and 7B, a system 700 is shown in accordance with one embodiment, wherein system 700 comprises a first electronic postmarking terminal 702, wherein the first electronic postmarking terminal 702 comprises: a first processor 704, a document scanner 706 connected to the first processor 704, a communications module 708 connected to the first processor 704 and operative to connect to a computer network 709, such as a world wide web, and a user input device 710 connected to the first processor 704, a server 712 connected to the first electronic postmarking terminal 702 via the computer network 709, a recipient client 714 connected to the computer network 709, and computer executable instructions (not shown) readable by the first processor 704 and operative to use the user input device 710 to allow a user 716 to log-in to the user's e-mail account or user account, use the document scanner 706 to scan a physical document 718 and convert it into a digital document 720 or use the user input device to allow the user 716 to enter an electronic message 722, generate a first checksum 724 based on the digital document or electronic message 720, 722, and transmit the first checksum 724 to the server 712, encrypt the electronic message or digital document 720, 722, use the communications module 708 to receive a unique postal identifier 726 from the server 712 and associate the unique postal identifier 726 with the encrypted electronic message or digital document 720, 722 and use the communications module 708 to transmit the encrypted electronic message or digital document 720, 722 to the recipient client 714 via the computer network 709.

In some embodiments, the server 712 comprises an electronic postmark server, which may contain a plurality of electronic postmarks, wherein each postmark may comprise a unique postal identifier, and wherein each electronic postmark may be obtained from a governmental postal agency or authority. In some embodiments, the electronic postmark server may comprise a governmental postal agency or authority postmark server.

In another embodiment, the user e-mail account may comprise, but is not limited to, an account with a third-party e-mail provider, wherein the third-party e-mail provider may comprise, but is not limited to, a web-based third party e-mail provider, an Exchange based third party e-mail provider, and the like.

In yet another embodiment, the recipient client 714 may comprise a second processor and computer executable instructions readable by the second processor and operative to decrypt the encrypted electronic message or digital document 720,722, use a display device connected to the second processor to display the decrypted electronic message or digital document 720, 722, generate a second checksum based on the decrypted electronic message or digital document 720, 722, receive the first checksum from 724 the server 712 (e.g. via network 709), compare the first checksum 724 with the second checksum and if the first checksum 724 and second checksum are different, then alert a user of the recipient client 714 or transmit an alert to the server 712 or the first electronic postmarking terminal 702. The alert may comprise a visual alert, such as a light, an alert displayed on a screen, and audible alert broadcasted through speakers, an e-mail alert, a text message alert, and the like. If the first checksum 724 and second checksum are different, it is indicative that someone may have accessed and/or tampered with the electronic message or digital document 720, 722. Therefore, in some embodiments, the alert may be transmitted to a law enforcement agency for follow-up and investigation into the possible breach of privacy.

In some embodiments, the first electronic postmark terminal 702 may comprise a document printer, wherein the computer executable instructions may be operative to receive an encrypted electronic message or digital document, decrypt the encrypted electronic message or digital document, and use the document printer to print the electronic message or digital document. In a second embodiment, the recipient client 714 may comprise a document printer, which may be to receive encrypted electronic message or digital document 720, 722, decrypt the encrypted electronic message or digital document 720, 722, and use the document printer to print the electronic message or digital document 720, 722.

In another embodiment, the computer executable instructions may be operative to charge the user 716 a fee for transmitting the encrypted electronic message or digital document 720, 722. The user 716 may be given the option to pay the fee at the terminal 702, such as by depositing cash or coins, using a credit card, and the like. In an alternate embodiment, the fee may be deducted from the user's 716 user account.

In yet a further embodiment, the computer executable instructions may be operative to allow the user 716 to access a contact list, wherein the contact list is stored on the server 712, allow the user 716 to add a recipient to the contact list, and if the recipient accepts the addition, then establish a unique encryption key for the user and recipient to use to decrypt messages sent between the user 716 and recipient, allow user 716 to select a recipient from the contact list, obtain or use the server 712 to obtain at least one license or electronic postmark from a government postal authority, wherein the license or electronic postmark may comprise the unique postal identifier 726, encrypt the electronic message or digital document 720, 722 using 256 bit encryption, set or trigger automatic deletion of the electronic message or digital document 720, 722, prevent the forwarding of the electronic message or digital document 720, 722, allow for the recall of the electronic message or digital document 720, 722, block printing of the electronic message or digital document 720, 722, use the communications module 708 to connect to a POP or SMTP address or server associated with the user's 716 e-mail account, such as third-party e-mail provider POP or SMTP address or server, divert non-encrypted received e-mail to a special folder, such as a spam or junk-mail folder, store the encrypted or non-encrypted electronic message or digital document 720, 722 on the server 712, operate a SMTP or POP server on the first electronic postmarking terminal 702, or associate the unique postal identifier 726 with the contents, subject, sender, recipient, attachments, time, date, or size of the electronic message or digital document 720, 722.

In some embodiments, recipient client 714 comprises a second electronic postmarking terminal, wherein the second electronic postmarking terminal may be substantially similar to first electronic postmarking terminal 702 and the various other embodiments described herein.

In yet another embodiment, the first electronic postmark terminal 702 may comprise a kiosk or standalone public access terminal, wherein said kiosk or public access terminal may be made available to users in public places, such as schools, offices, post offices, copy/print service provider locations, airports, malls, parks, libraries, government agencies, prisons, sports venues, theatres, convention centers, and the like. In yet another embodiment, the kiosk or access terminal may be made available to users for use in their private homes or offices.

In yet another embodiment, the first electronic postmark terminal may comprise a personal computer, laptop computer, tablet PC, or mobile device.

In some embodiments, the computer executable instructions may comprise an e-mail client, such as, but not limited to, a downloadable e-mail client. The e-mail client may be operative to allow the user 716 to connect to a third party e-mail provider or account therewith, and retrieve or send messages using the third party e-mail provider. The e-mail client may be similar in function to popular e-mail clients such as MICROSOFT OUTLOOK™, THUNDERBIRD™, APPLE MAIL™, and the like. In yet another embodiment, the computer executable instructions may comprise a plug-in to existing e-mail clients, such as those named above. In essence, the computer executable instructions may "piggyback" or work in connection with an existing e-mail provider.

In some embodiments the computer executable instructions may be operative to allow the user 716 to create a trusted contacts list, wherein the trusted contacts list may comprise those contacts with whom user 716 exchanges encrypted electronic messages and/or digital documents. The computer executable instructions may be operative to provide user 716 and their trusted contacts with unique encryption keys which may be used to decrypted encrypted electronic messages or digital documents sent between user 716 and their trusted contacts.

In some embodiments, the computer executable instructions may be operative to allow the user 716 to purchase at least one electronic postmark, or a plurality or block of electronic postmarks, wherein each electronic postmark comprises a unique identifier 726, wherein the electronic postmark comprises an electronic postmark issued by at least one governmental postal authority or agency, such as, but not limited to, the United States Postal Service.

In some embodiments, first electronic postmarking terminal 702 may comprise a computer readable medium reading device, such as a computer port, a wireless communications device, a peripheral port, and the like. In another embodiment electronic postmarking terminal 702 may comprise a removable, or non-removable computer readable medium, such as a portable computer readable medium, including, but not limited to, a flash drive, a CD-ROM, a DVD, a thumb drive, and the like. The computer executable instructions may be operative to read, retrieve, copy, download, etc., the electronic message or digital document 720,722 from the computer readable medium.

Figure 9A:
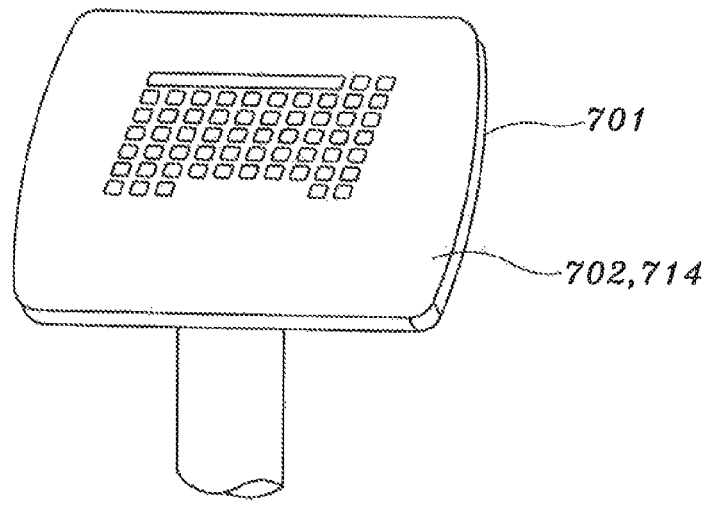
FIGS. 9A-9C show a system in accordance with various embodiments.
Figure 9B:
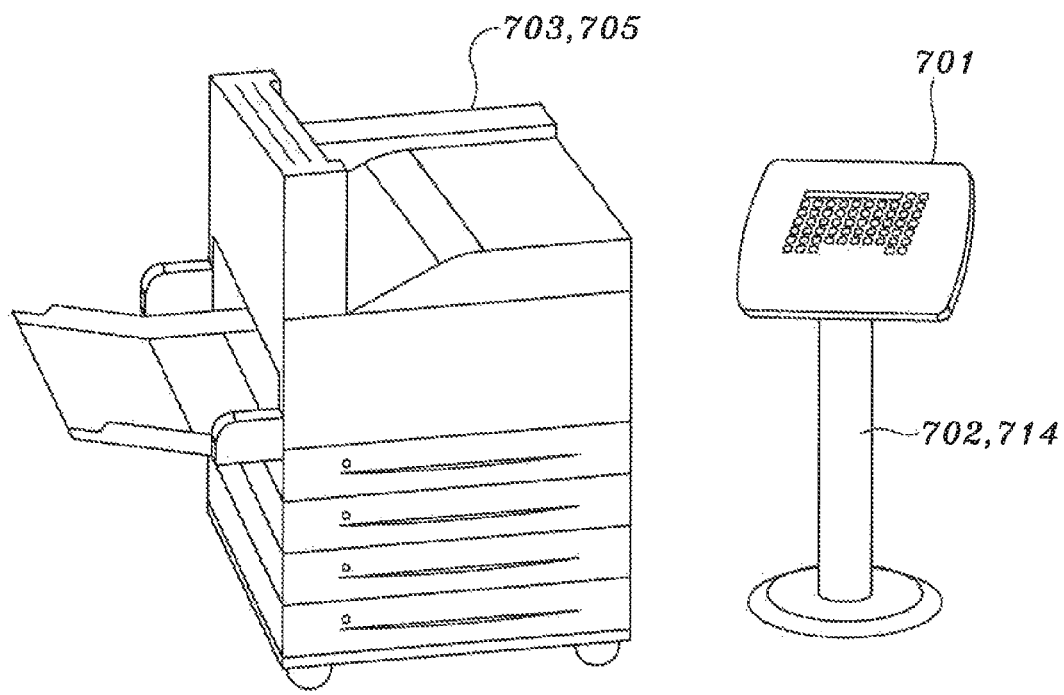
Figure 9C:
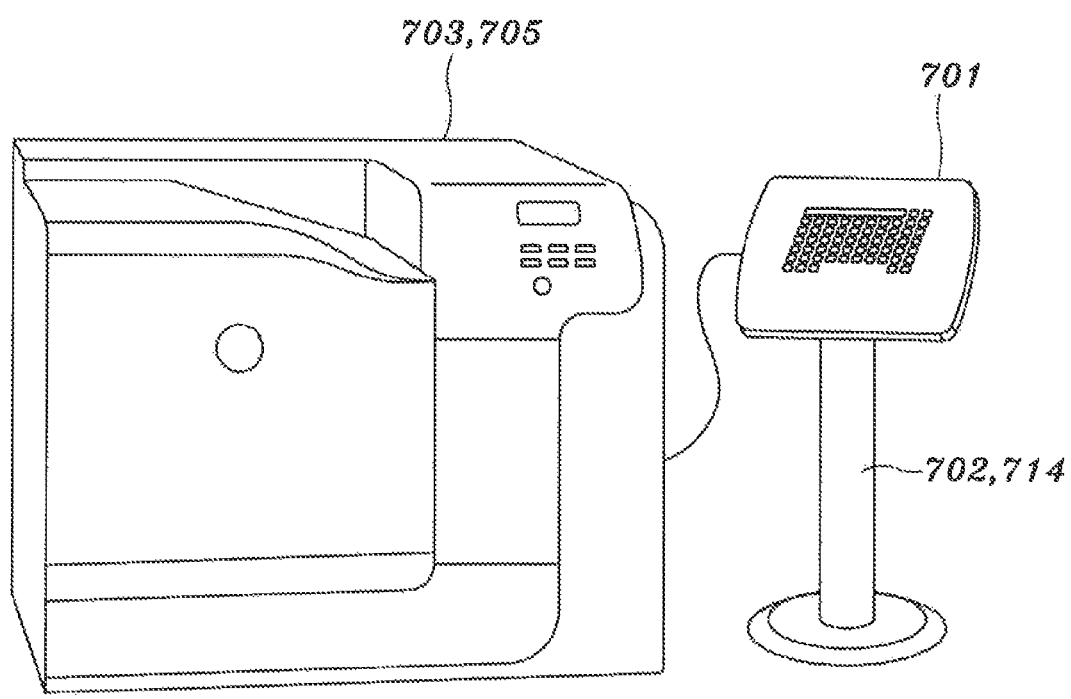

In some embodiments, electronic message or digital document 720,722 may comprise a ballot, a survey, or poll, such as an exit poll. In some embodiments, the computer executable instructions may be operative to use a display device 701 display an electronic ballot, survey, or poll, to user 716, as shown in FIG. 9A. In an alternate embodiment, the ballot may be scanned or read by a scanner 703 connected to or integrated with first electronic postmarking terminal 702, and then encrypted, postmarked, and/or transmitted as electronic message or digital document 720,722, as shown in FIGS. 9B and 9C. In some embodiments, a recipient of electronic message or digital document 720,722 may be allowed to print electronic message or digital document 720,722 using a printer 705 that is part of or connected to a recipient module 714 (shown in FIGS. 9B and 9C).

In some embodiments, the recipient of a ballot, survey, poll, etc., may comprise an election official or authority.

In another embodiment, the first electronic postmark terminal 702 may comprise a location determination device, such as a global positioning module, a wireless network positioning module, a cellular positioning module, and the like, and wherein the computer executable instructions may be operative to use the location determination device to determine and verify a location of the first electronic postmarking terminal 702, and if the electronic postmarking terminal 702 is used to submit a message or other communication, such as a ballot, then verify the legitimacy of the ballot, since in many cases remote voting can be fraudulent.

Figure 8A:
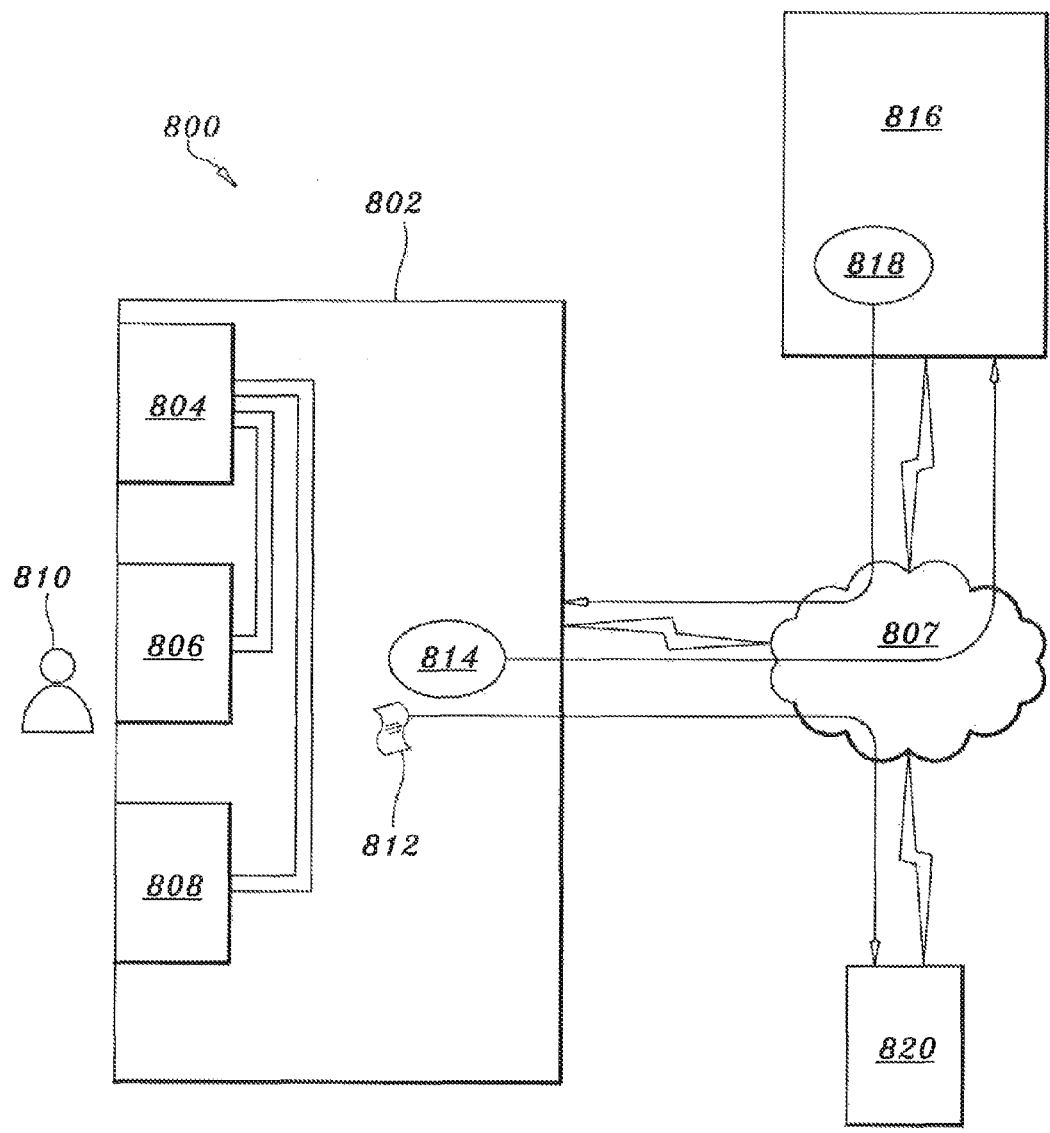
FIG. 8A shows a block diagram depicting a system in accordance with one embodiment.
Figure 8B:
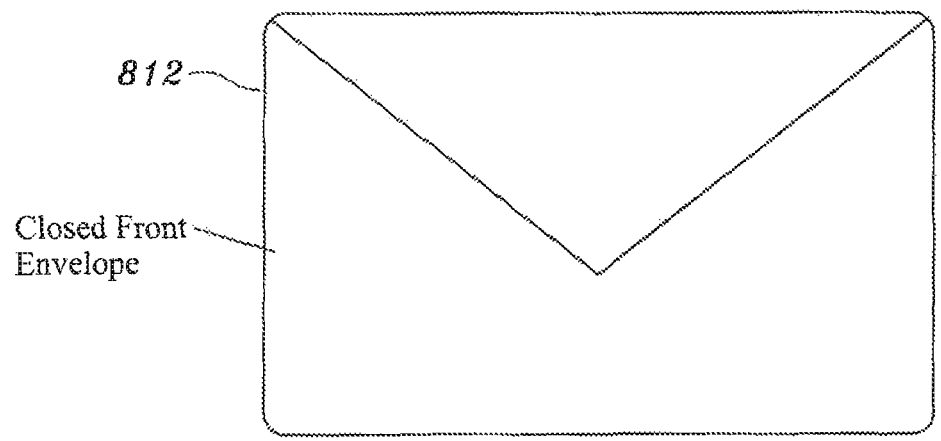
FIG. 8B shows a user interface in accordance with one embodiment.

Referring now to FIGS. 8A and 8B, a system 800 is shown in accordance with one embodiment, wherein system 800 comprises a first electronic postmarking module 802, wherein the first electronic postmarking module 802 comprises: a first processor 804, a communications module 806 connected to the first processor 804 and operative to connect to a computer network 807, and a user input device 808 connected to the first processor 804, and computer executable instructions readable by the first processor 804 and operative to: use the user input device 808 to allow a user 810 to log-in to the user's e-mail account or user account, use the user input device 808 to allow at least one user 810 to enter an electronic message 812 or select an electronic message 812, generate a first checksum 814 based on the electronic message 812, and transmit the first checksum to a server 816, encrypt the electronic message 812, use the communications module 806 to receive a unique postal identifier 818 from server 816 and associate the unique postal identifier 818 with the encrypted electronic message 812, and use the communications module 806 to transmit the encrypted electronic message 812 to a recipient client 820 via the computer network 807.

In some embodiments, the server 816 comprises an electronic postmark server, which may include, but is not limited to, the various embodiments described herein.

In other embodiments, the user e-mail account comprises an account with a third-party e-mail provider, which may include, but is not limited to, the various embodiments described herein. In some embodiments, the third-party e-mail provider comprises a web-based third party e-mail provider. In other embodiments, the third-party e-mail provider comprises an Exchange based third party e-mail provider.

In one embodiments, the recipient client 820 comprises a second processor and computer executable instructions readable by the second processor and operative to decrypt the encrypted electronic message 812, use a display device connected to the second processor to display the decrypted electronic message 812, generate a second checksum based on the decrypted electronic message 812, receive the first checksum 814 from the server 816, compare the first checksum 814 with the second checksum and if the first checksum 814 and second checksum are different, then alert a user of the recipient client 820 or transmit an alert to the server 816 and/or user 810.

In another embodiment, the recipient client 820 comprises a second processor and computer executable instructions readable by the second processor and operative to decrypt the encrypted electronic message 812, use a display device connected to the second processor to display the decrypted electronic message 812, generate a second checksum based on the decrypted electronic message 812, transmit the second checksum to the server, which compares the first checksum 814 with the second checksum and if the first checksum 814 and second checksum are different, then alert a user of the recipient client 820 or transmit an alert to the server 816, and/or user 810.

In some embodiments, the first electronic postmarking module 802 comprises a document printer, wherein the computer executable instructions are operative to receive an encrypted electronic message, decrypt the encrypted electronic message or digital document, and use the document printer to print the electronic message.

In some embodiments, the computer executable instructions may be operative to charge the user 810 a fee for transmitting the encrypted electronic message or digital document 812, wherein said process, may include, but is not limited to, the various embodiments described herein.

In some embodiments, electronic message 812 comprises a video, a presentation, an image animation, or a recording, such as a sound or video recording (see FIG. 8B).

In a further embodiment, the computer executable instructions are operative to: allow the user 810 to access a contact list, wherein the contact list is stored on the server 816, allow the user 810 to add a recipient to the contact list, and if the recipient accepts the addition, then establish a unique encryption key for the user 810 and recipient to use to decrypt messages sent between the user 810 and recipient, allow a user 810 to select a recipient from the contact list, obtain or use the server 816 to obtain at least one license, electronic postmark from a government postal authority, wherein the license or electronic postmark may comprise the unique postal identifier 818, encrypt the electronic message 812 or digital document using 256 bit encryption, set or trigger automatic deletion of the electronic message 812, prevent the forwarding of the electronic message 812, allow for the recall of the electronic message 812, block printing of the electronic message 812, use the communications module 806 to connect to a POP or SMTP address or server associated with the user's e-mail account, divert non-encrypted received e-mail to a special folder, store the encrypted or non-encrypted electronic message 812 on the server 816, operate a SMTP or POP server on the first electronic postmarking module 802, associate the unique postal identifier 818 with the contents, subject, sender, recipient, attachments, time, date, or size of the electronic message 812 or digital document, where the electronic message 812 comprises a video, a presentation, an image animation, or a recording, then prevent a recipient from downloading or saving the electronic message 812, preventing the recipient from fast forwarding, pausing, rewinding, or replaying the electronic message 812, display the electronic message 812 in a window, or provide a user with a user interface to open or play the electronic message 812, wherein the user interface comprises at least one virtual input module, wherein the virtual input module comprises at least one virtual button.

In some embodiments, first electronic postmarking module 802 may comprise a computer readable medium reading device, such as a computer port, a wireless communications device, a peripheral port, and the like. In another embodiment electronic postmarking module 802 may comprise a removable, or non-removable computer readable medium, such as a portable computer readable medium, including, but not limited to, a flash drive, a CD-ROM, a DVD, a thumb drive, and the like. The computer executable instructions may be operative to read, retrieve, copy, download, etc., the electronic message 812 from the computer readable medium.

In some embodiments, electronic message 812 may comprise a ballot, a survey, or poll, such as an exit poll. In some embodiments, the computer executable instructions may be operative to display an electronic ballot, survey, or poll, to user 810, as shown in FIG. 9A. In an alternate embodiment, the ballot may be scanned or read by a scanner connected to or integrated with first electronic postmarking module 802, and then encrypted, postmarked, and/or transmitted as electronic message 812, as shown in FIGS. 9B and 9C. In some embodiments, a recipient of electronic message 812 may be allowed to print electronic message 812 using a printer that is part of or connected to a recipient module (shown in FIGS. 9B and 9C).

In some embodiments, the recipient of a ballot, survey, poll, etc., may comprise an election official or authority.

In another embodiment, the first electronic postmark module 802 may comprise a location determination device, such as a global positioning module, a wireless network positioning module, a cellular positioning module, and the like, and wherein the computer executable instructions may be operative to use the location determination device to determine and verify a location of the first electronic postmarking module 802, and if the electronic postmarking module 802 is used to submit a message or other communication, such as a ballot, then verify the legitimacy of the ballot, since in many cases remote voting can be fraudulent.

Figure 10A:
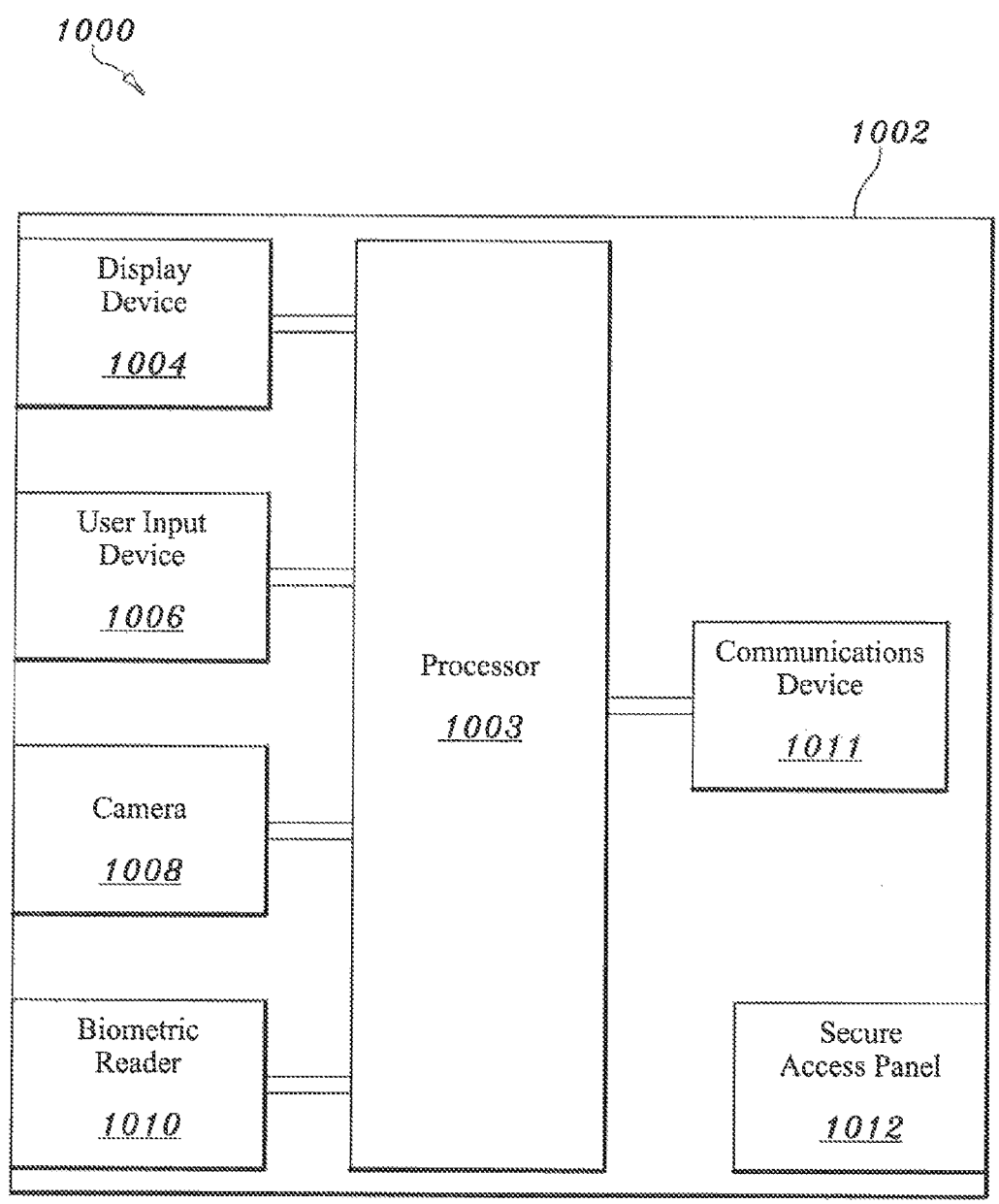
FIG. 10A shows a block diagram depicting a system in accordance with one embodiment.
Figure 10B:
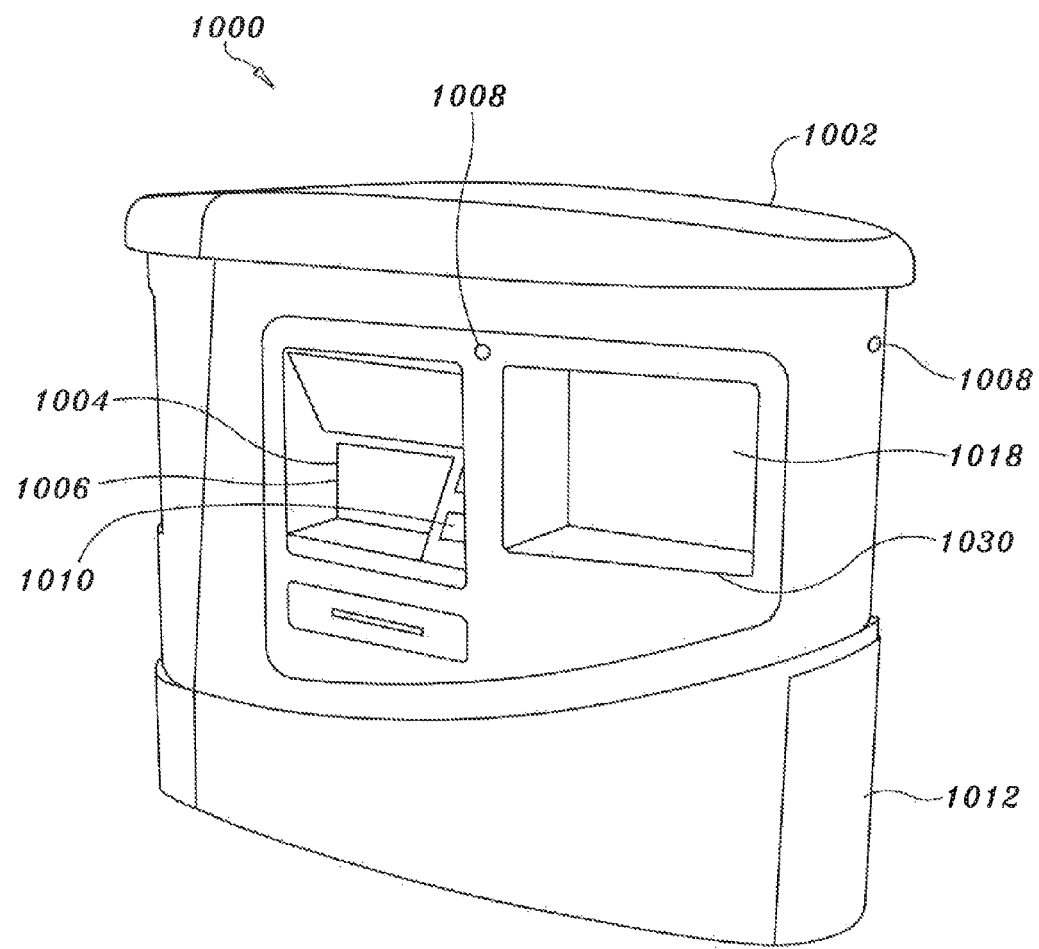
FIGS. 10B-10H show a system in accordance with various embodiments.
Figure 10C:
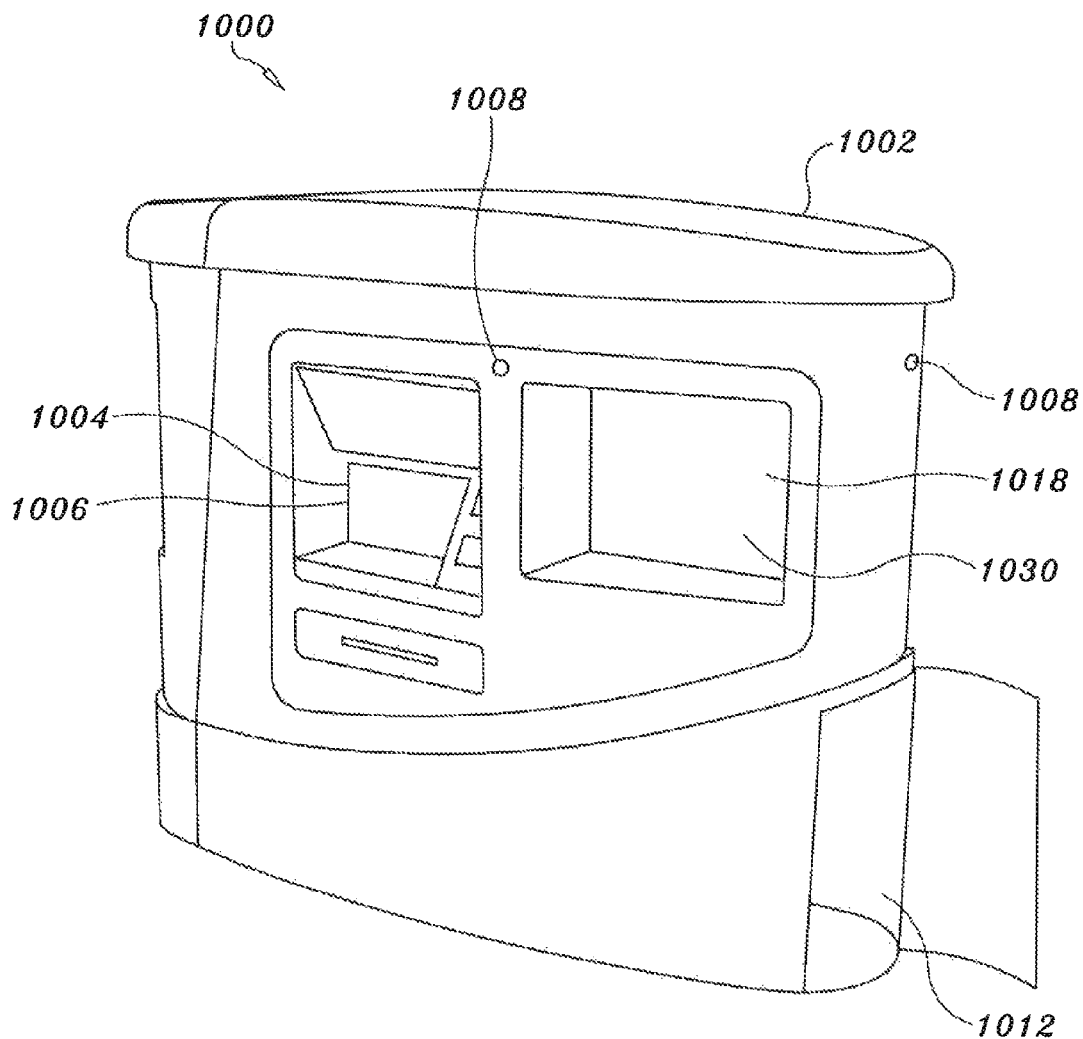
Figure 10D:
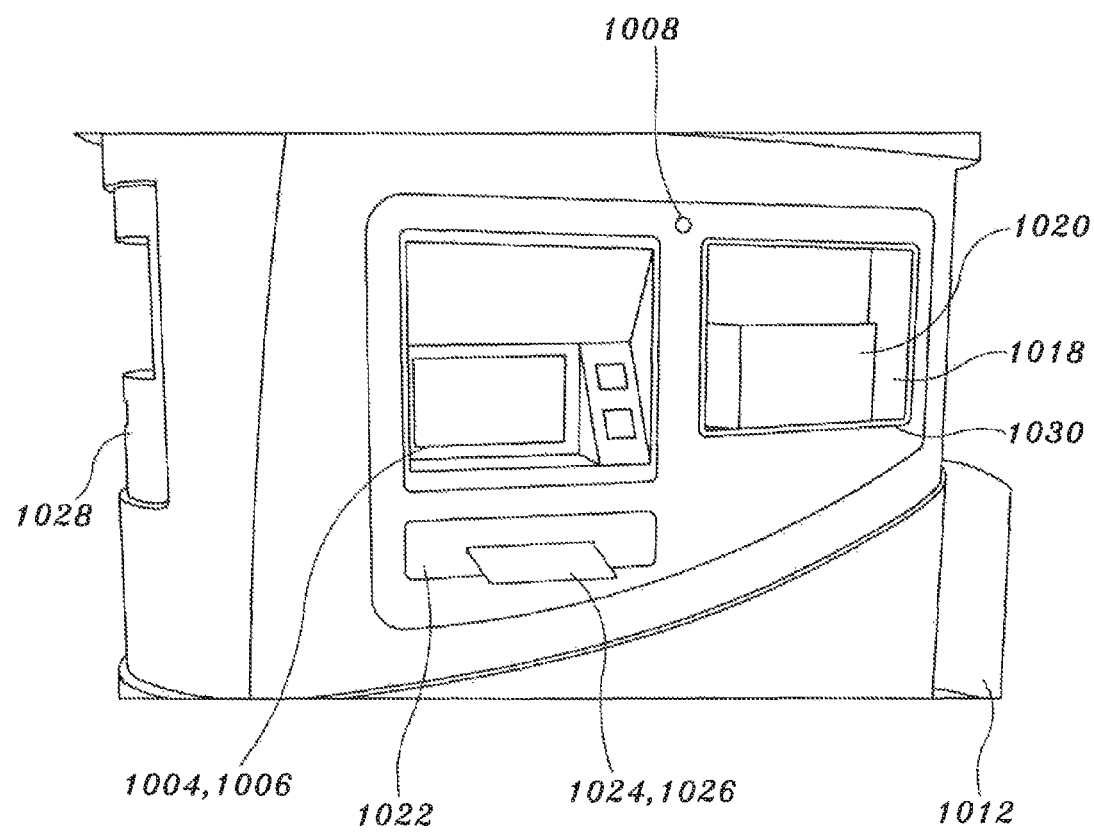
Figure 10E:
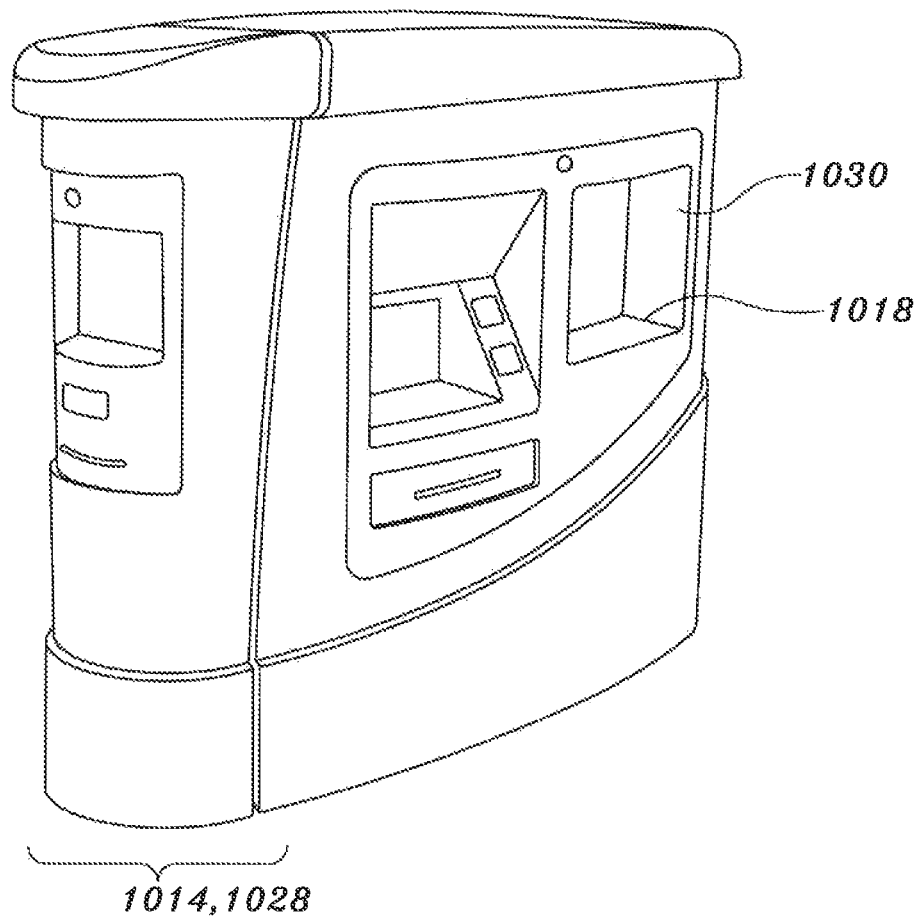
Figure 10F:
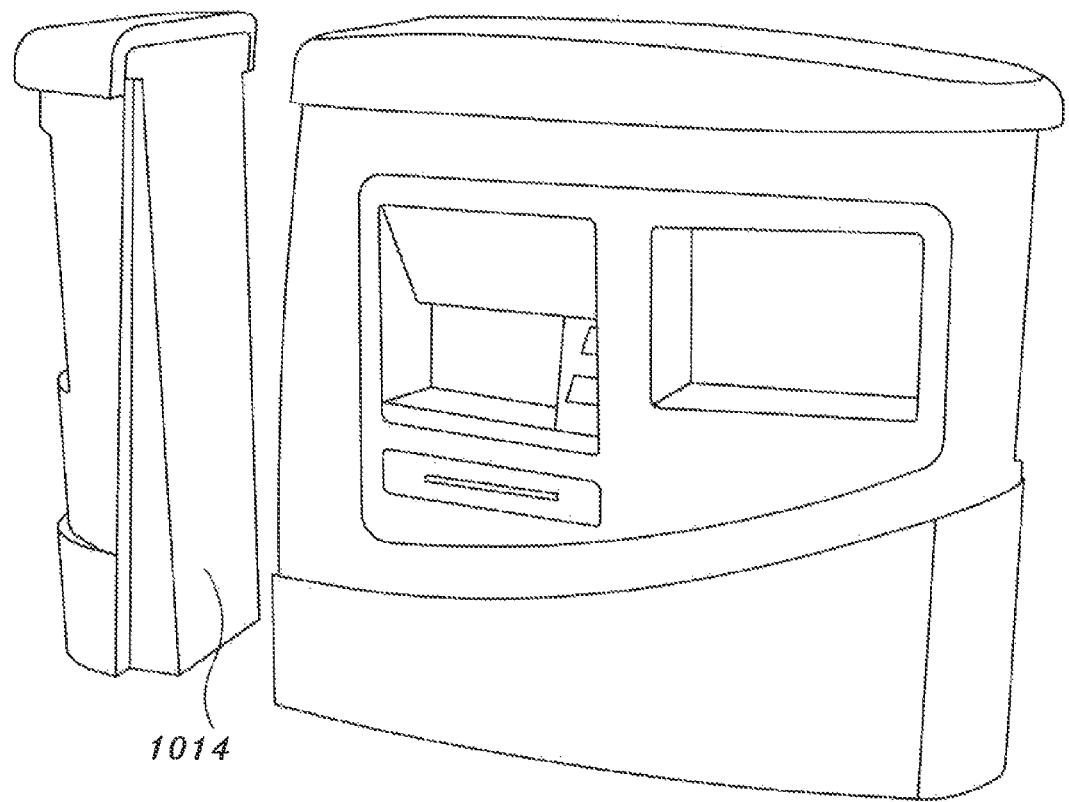

Referring now to FIG. 10A, a system 1000 is shown in accordance with one embodiment, wherein the system 1000 comprises a housing 1002, a processor 1003 positioned within the housing 1002, a display device 1004 disposed in the housing 1002 and connected to the processor 1003, a user input device 1006 connected to the processor 1003, a camera 1008 coupled to the housing 1002 and connected to the processor 1003, a biometric reader 1010 coupled to the housing 1002 and connected to the processor 1003, a communications device 1011 connected to the processor 1003, a secure access panel 1012 incorporated in the housing 1002, and computer executable instructions readable by the processor 1003 and operative to: allow an installer to secure the secure access panel 1012 upon installation of the system 1000 at a location, use the biometric reader 1010 to collect the installer's biometric identifier upon installation, use the communications device 1011 to notify a central station of the system's installation and transmit the installer's biometric identifier and time of installation to the central station, use the display device 1004 to display functionality options, wherein the functionality options comprise, log in to a user account, enter an electronic message, scan a document, upload a digital document, transmit the electronic message, document, or digital document to a recipient, purchase postage, purchase electronic postage, weigh a parcel, obtain a passport photo, obtain a notarization, photocopying, purchase a greeting card, access user documents, or have postage printed on an envelope, and use the user input device 1006 to allow a user to select one or more of the functionality options, and/or use the biometric reader 1010 or camera 1008 to verify the identity of a user, an installer, or a postal worker attempting to open the secure access panel 1012.

Figure 10G:
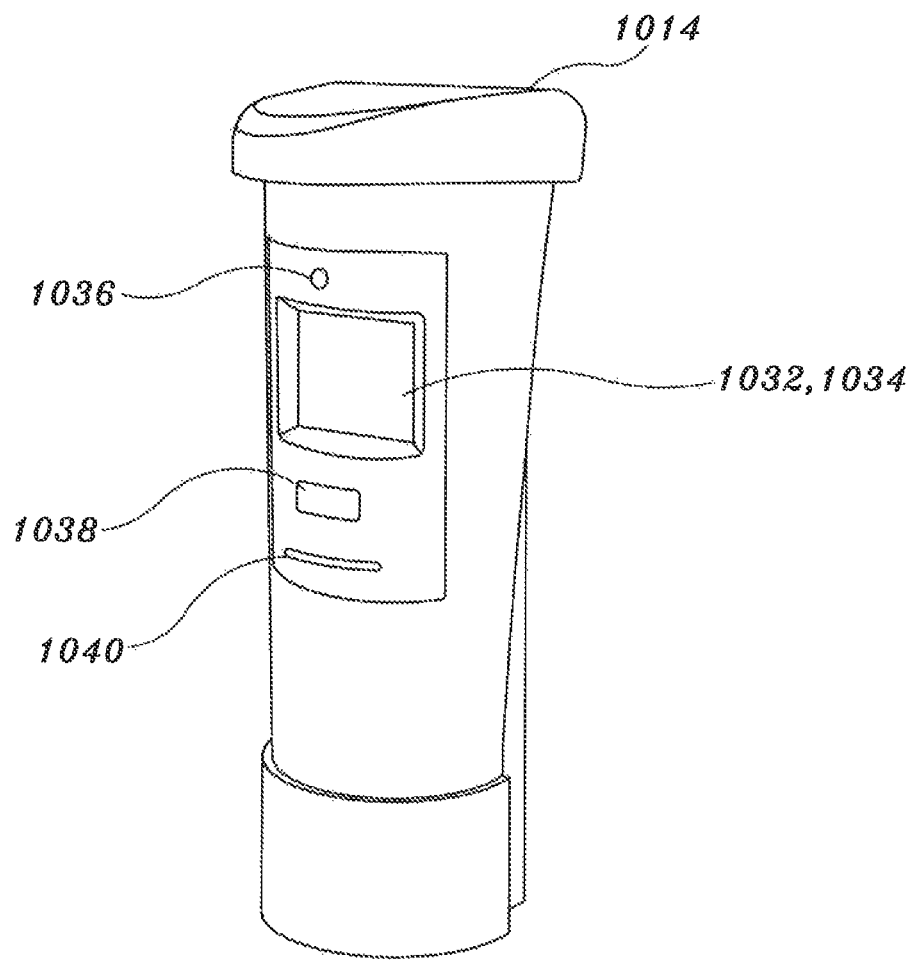
Figure 10H:
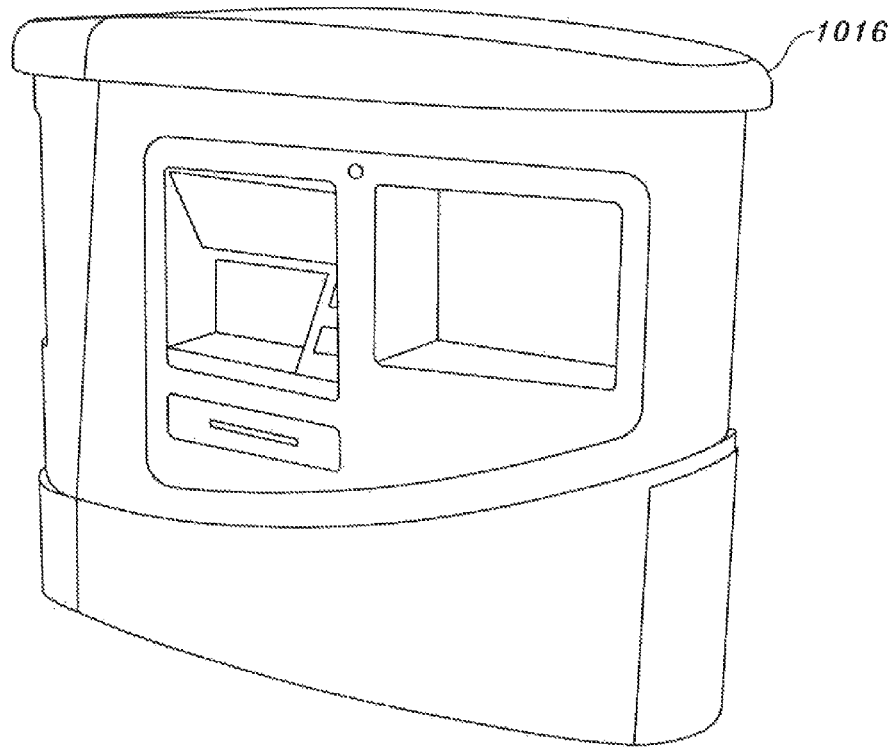

In some embodiments, the housing 1002 may comprise any type of housing 1002 made of any type of material, such as a terminal housing, a secure housing, a damage proof housing, a rugged housing, and the like. In some embodiments, the housing 1002 may comprise a terminal, as shown in FIGS. 10B-10F, a terminal with a detachable mobile unit, shown as mobile unit 1014 in FIGS. 10E-10G, or a scaled down terminal, shown as 1016 in FIG. 10H, which may comprise similar components to its full-size counterpart.

In some embodiments, the detachable mobile unit 104 may comprise a display device 1032, a user input device 1034, a camera 1036, a biometric reader 1038, and a printer, scanner, cash output, or mail depository 1040. In some embodiments, the detachable mobile unit 1014 may be formed such as to integrate with housing 1002, wherein said integration may appear to be seamless or continuous (e.g. as if mobile unit 1014 and housing 1002 formed a single unit when connected). Thus, in some embodiments, housing 1002 and detachable mobile unit 1013 may comprise interface surfaces or portions with contours that align or are complimentary.

The processor 1003 may comprise any type of processor 1003 including, but not limited to, a computer processor, a single core processor, a multi core processor, and the like.

The display device 1004 may comprise any type of display device 1004, such as an LED or LCD screen.

The user input device 1006 may comprise any type of user input device 1006, such as a touch screen, a button, a keypad, a gesture control device, and the like.

The camera 1008 may comprise any type of camera 1008, such as a security camera, an infrared camera, a traditional camera, a 3D camera, and the like.

In some embodiments, the biometric reader 1010 may comprise any type of biometric reader 1010, such as a fingerprint/palm print reader/scanner, an eye/iris scanner/reader, a camera 1008, and the like, which may include computer executable instructions operative to perform biometric analysis, such as image recognition and comparison, and the like.

In further embodiments, the communications device 1011 may comprise any type of communications device 1011, such as, but not limited to, a wireless communications device, including a wireless local area network ("WLAN") module, a GSM module, a LTE module, and the like, wherein the communications device 1011 may be operative to connect, wirelessly or non-wirelessly, to a local or wide area communications network, such as the internet.

In some embodiments, the secure access panel 1012 may comprise any type of secure access panel 1012, such as a door, a slot, a panel, a sliding door, and the like. The secure access panel 1012 may comprise a locking mechanism, such as a lock, and the like. The locking mechanism may be operative to activate or deactivate based on whether a user attempting to open the access panel 1012 has had their identity verified by using the biometric reader 1010 or user input device 1006.

In some embodiments, allowing an installer to secure the secure access panel 1012 upon installation of the system at a location comprises allowing an installer to perform an initialization, or "first time" securing/locking of the secure access panel 1012, whereby said first-time securing/locking may trigger an activation signal or notification to the central station thereby notifying the central station that the system has been deployed or installed in at the location, and that the system is ready to operate. The initialization process may comprise using the biometric reader 1010 or user input device 1006 to verify the identity of an installer, and using a location determination device coupled to the processor 1003, such as a GPS module, WiFi positioning module, cellular positioning module, and the like, to determine a location of the system and verify the location of the system, as well as verify the time and date of the installation/initialization. The location may comprise any commercial, residential, public, or governmental location, such as a postal office, a copy services store, a library, an office building, a home, an office, an apartment building, a bank, and the like. The central station may comprise an operator of the system, and/or services/functions offered through the system. The notification and other information, such as biometric identifier, date, time, and location may be transmitted by using the communications device.

In some embodiments, the using the display device 1004 to display functionality options to a user may comprise using a user interface to display functionality options.

In some embodiments, logging into a user account may comprise any of the various embodiments described herein throughout the present disclosure.

Entering an electronic message may comprise any of the various embodiments described herein throughout the present disclosure.

Scanning a digital document may comprise any of the various embodiments described herein throughout the present disclosure. Accordingly, the system may comprise a scanner coupled to the processor 1003, and/or the housing 1002.

Transmitting the electronic message, document, or digital document to a recipient may comprise any of the various embodiments described herein throughout the present disclosure, including those various embodiments that incorporate secure transmitting mechanisms and modules, which include the usage of encryption and checksum verification.

In some embodiments, purchasing postage comprises allowing a user to use a scale to weigh a physical parcel, pay for postage, wherein the postage amount is based on the weight of the physical parcel, and then print the postage which may be affixed to the parcel. In a further embodiment, purchasing postage may comprise any of the various embodiments described herein throughout the present disclosure.

In some embodiments, purchasing electronic postage may comprise any of the various embodiments described herein throughout the present disclosure.

In some embodiments, weighing a parcel 1020 may comprise using a scale 1018 coupled to the processor 1003 and/or housing 1002 to weigh the parcel 1020.

Obtaining a passport photo may comprise using the camera 1008 to capture an image of a person, then possibly use the processor 1003 to format the image to passport size, and then use a printer 1022 coupled to processor 1003 and/or housing 1002 to print a passport photo. Users may be charged for obtaining passport photos.

In some embodiments, obtaining a notarization may comprise inserting a document 1024 in a printer and having a notary seal printed on it. A notary may use the camera 1008 to observe an execution of a document 1024 remotely, and then use the printer 1022 to remotely issue a notary seal on the document.

In some embodiments, photocopying may be carried out by using a photocopier or printer/scanner 1022 coupled to the processor 1003 and/or housing 1002.

Purchasing a greeting card may comprise displaying greeting card options on the display device 1004, and allowing a user to use the user input device 1006 to select one of the greeting cards, input a personal greeting, and the like, and use the camera 1008 to capture an image of a user to insert in a greeting. The greeting cards may be preloaded into the housing 1002 and then ejected upon purchase, or the greeting cards may be printed using the printer upon purchase.

In some embodiments, accessing user documents may comprise allowing a user to log-into an account, and then use the communications device 1011 to access user documents on a computer readable medium, such as a local or portable computer readable medium, or documents on a remote server.

In some embodiments having postage printed on an envelope may comprise allowing a user to insert an envelope 1026 into the printer 1022 and then printing postage on the envelope.

The system may further comprise allowing a user to use the user input device 1006 to select one or more of the functionality options, which, may comprise any of the various embodiments described herein throughout the present disclosure.

In a further embodiment, the computer executable instructions may be operative to use the biometric reader 1010 or camera 1008 to verify the identity of a user, an installer, or a postal worker attempting to use the system or access/open the secure access panel 1012. The secure access panel 1012 may prevent access to a mail depository, mail container, or money container.

In another embodiment, the system may comprise an apparatus to fix the housing 1002 to a structure, wherein said apparatus to fix the housing 1002 to a structure is coupled to the housing 1002. Said apparatus may comprise a mounting bracket, bolts, screws, a lock, and the like.

In some embodiments, the system may further comprise a printer 1022 for printing documents, electronic messages, printing postage, or for printing postage on an envelope 1026, wherein said printer 1022 is connected to the processor 1003, which may comprise any of the various embodiments described herein throughout the present disclosure.

In some embodiments, the system may further comprise a scale 1018 connected to the processor 1003 for weighing parcel 1020, which may comprise any of the various embodiments described herein throughout the present disclosure, such as an electronic scale, and the like.

In some embodiments, the computer executable instructions may be operative to allow a user to access their financial statements, such as by allowing a user to access their bank statements, insurance statements, loan statements, and the like, by using the communications device 1011 to connect to a remote server at the bank, insurance, company, and the like. Any identity verification may be carried out by using the user input device 1006 to enter a username and/or password, or by using the biometric reader 1010 collect a biometric identifier from a user. In some embodiments, financial related transactions and inquiries may be handled by a second terminal 1028 disposed in system, wherein said second terminal 1028 may comprise a detachable mobile unit (shown in FIG. 10F), or a fixed terminal.

In some embodiments, the system may comprise a computer readable medium reading device, wherein the computer readable medium reading device is coupled to the processor 1003, which may comprise any of the various embodiments described herein throughout the present disclosure, such as a flash storage reader, a CD-ROM drive, and the like.

In some embodiments, the system may further comprise a payment module, wherein the payment module is coupled to the processor 1003, wherein said payment module may be any type of payment module, such as, but not limited to, a credit card reader, a cash acceptor, a coin acceptor, a near-field-communications device, and the like.

In some embodiments, the system may further comprise at least one parcel receiving module 1030, wherein the parcel receiving module 1030 is coupled to the housing 1002, wherein said module 1030 may comprise any of the various embodiments described herein throughout the present disclosure, such as, but not limited to, a mail/parcel slot, a mail/parcel depository/container, and the like. In some embodiments, the parcel receiving module 1030 may be integrated with the scale, such as by having the scale slide, flip, or drop out of the way revealing a parcel container. In another embodiment, parcel receiving module 1030 may comprise a secure area secured by the secure access panel 1012.

In some embodiments, the computer executable instructions may be configured to use the camera 1008 or biometric reader 1010 to verify the identity of a user, which may be required to grant access to the user's account. Further, system 1000 may be associated with a particular location, which may be entered into a database or may be determined via a GPS module disposed in the housing 1002. In a further embodiment, the identity of a user and location of the system 1000 may be used to verify that a user is indeed traveling in a certain location, where, for example, a user has forgotten to inform his or her financial institution. Thus, the financial institution may grant the user rights to use their services, such as credit and debit services, in that location, which may be abroad.

Figure 11A:
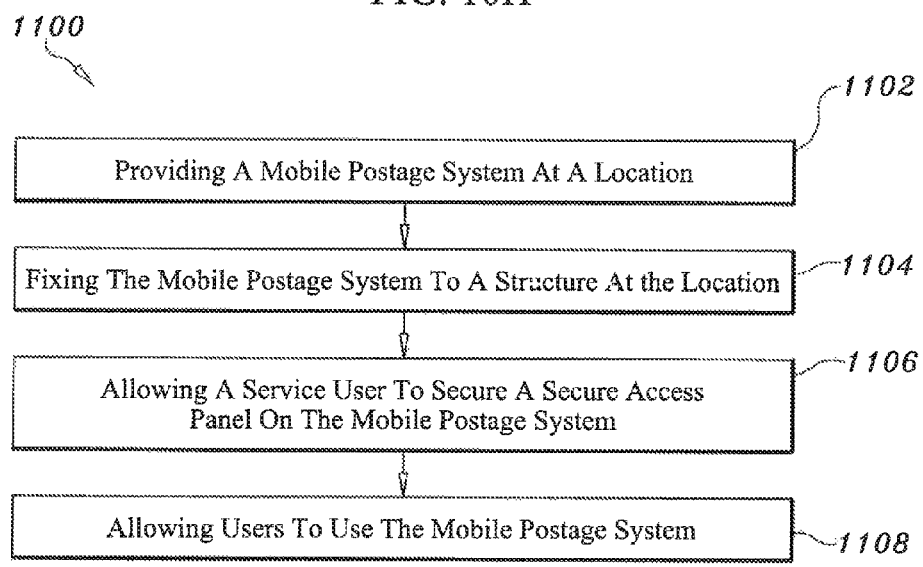
FIG. 11A shows a block diagram depicting a method in accordance with one embodiment.
Figure 11B:
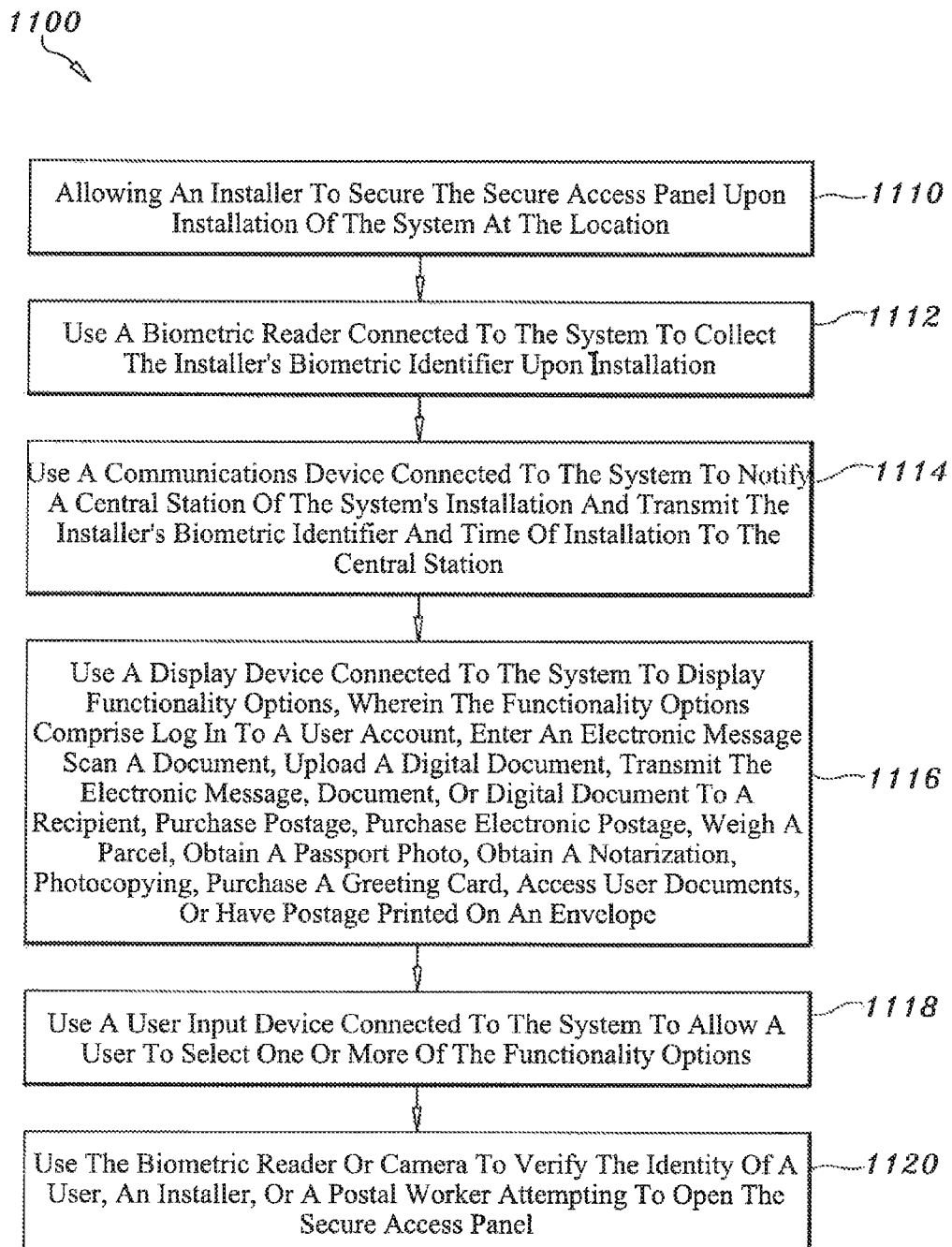
FIG. 11B shows a block diagram depicting a method in accordance with another embodiment.

Referring now to FIG. 11A-11B, a method 1100 is shown in accordance with one embodiment, wherein method 1100 may comprise: providing a mobile postage system at a location (block 1102), fixing the mobile postage system to a structure at the location (block 1104), allowing a service user to secure a secure access panel on the mobile postage system (block 1106), allowing users to use the mobile postage system (block 1108).

In some embodiments, method 1100 may comprise allowing an installer to secure the secure access panel upon installation of the system at the location (block 1110), use a biometric reader connected to the system to collect the installer's biometric identifier upon installation (block 1112), use the a communications device connected to the system to notify a central station of the system's installation and transmit the installer's biometric identifier and time of installation to the central station (block 1114), use a display device connected to the system to display functionality options, wherein the functionality options comprise, log in to a user account, enter an electronic message, scan a document, upload a digital document, transmit the electronic message, document, or digital document to a recipient, purchase postage, purchase electronic postage, weigh a parcel, obtain a passport photo, obtain a notarization, photocopying, purchase a greeting card, access user documents, or have postage printed on an envelope (block 1116), use a user input device connected to the system to allow a user to select one or more of the functionality options (block 1118), and/or use the biometric reader or camera to verify the identity of a user, an installer, or a postal worker attempting to open the secure access panel (block 1120).

In some embodiments, the various steps of method 1100 may comprise any or all of the various functions or method steps performed by system 1000 or any components thereof, and may be carried out using any or all of the components thereof.

Hardware and Operating Environment

This section provides an overview of example hardware and the operating environments in conjunction with which embodiments of the inventive subject matter can be implemented.

A software program may be launched from a computer readable medium in a computer-based system to execute function defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 12 below.

Figure 12:
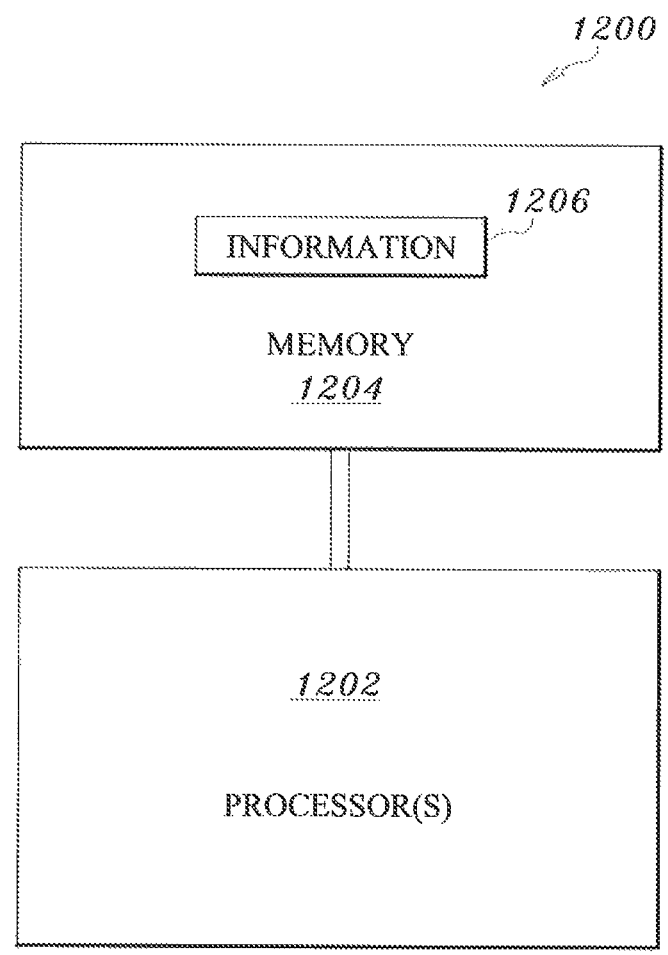
FIG. 12 shows a block diagram depicting an article in accordance with one embodiment.

FIG. 12 is a block diagram representing an article 1200 according to various embodiments. Such embodiments may comprise a computer, a memory system, a magnetic or optical disk, some other storage device, or any type of electronic device or system. The article 1200 may include one or more processor(s) 1202 couple to a machine-accessible medium such as a memory 1204 (e.g., a memory including electrical, optical, or electromagnetic elements). The medium may contain associated information 1206 (e.g., computer program instructions, data, or both) which, when accessed, results in a machine (e.g., the processor(s) 1202) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Accordingly, while the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
   a first electronic postmarking terminal, wherein the first electronic postmarking terminal comprises:
      a first processor;
      a document scanner connected to the first processor;
      a communications module connected to the first processor and operative to connect to a computer network; and
      a user input device connected to the first processor;
   a server connected to the first electronic postmarking terminal via the computer network;
   a recipient client connected to the computer network; and
   computer executable instructions readable by the first processor and operative to:
      use the user input device to allow a user to log-in to the user's e-mail account or user account;
      allow the user to add a recipient to a contact list, and if the recipient accepts the addition, then establish a unique encryption key for the user and recipient to use to decrypt messages sent between the user and recipient;
      obtain or use the server to obtain at least one license, electronic postmark from a government postal authority, wherein the at least one license or electronic postmark may comprise a unique postal identifier;
      use the scanner to scan a physical document and convert it into a digital document or use the user input device to allow the user to enter an electronic message;
      generate a first checksum based on the digital document or electronic message, and transmit the first checksum to the server;
      encrypt the electronic message or digital document;

use the communications module to receive the unique postal identifier from the server and associate the unique postal identifier with the encrypted electronic message or digital document; and use the communications module to transmit the encrypted electronic message or digital document to the recipient client via the computer network.

2. The system of claim 1, wherein the server comprises an electronic postmark server.

3. The system of claim 1, wherein the user e-mail account comprises an account with a third-party e-mail provider.

4. The system of claim 3, wherein the third-party e-mail provider comprises a web-based third party e-mail provider.

5. The system of claim 1, wherein the recipient client comprises a second processor and computer executable instructions readable by the second processor and operative to decrypt the encrypted electronic message or digital document, use a display device connected to the second processor to display the decrypted electronic message or digital document, generate a second checksum based on the decrypted electronic message or digital document, receive the first checksum from the server, compare the first checksum with the second checksum and if the first checksum and second checksum are different, then alert a user of the recipient client or transmit an alert to the server.

6. The system of claim 1, wherein the first electronic postmarking terminal comprises a document printer, wherein the computer executable instructions are operative to receive an encrypted electronic message or digital document, decrypt the encrypted electronic message or digital document, and use the document printer to print the electronic message or digital document.

7. The system of claim 1, wherein the computer executable instructions are operative to:

allow the user to access the contact list, wherein the contact list is stored on the server;
allow the user to select the recipient from the contact list;
encrypt the electronic message or digital document using 256 bit encryption;
set or trigger automatic deletion of the electronic message or digital document;
prevent the forwarding of the electronic message or digital document;
allow for the recall of the electronic message or digital document;
block printing of the electronic message or digital document;
use the communications module to connect to a POP or SMTP address or server associated with the user's e-mail account;
divert non-encrypted received e-mail to a special folder;
store the encrypted or non-encrypted electronic message or digital document on the server;
operate a SMTP or POP server on the first electronic postmarking terminal; or
associate the unique postal identifier with the contents, subject, sender, recipient, attachments, time, date, or size of the electronic message or digital document.

8. The system of claim 1, wherein the recipient client comprises a second electronic postmarking terminal.

9. The system of claim 1, wherein the computer executable instructions are operative to allow the user to connect to a third party e-mail provider or account therewith, and retrieve or send messages using the third party e-mail provider.

10. The system of claim 1, wherein the computer executable instructions are operative to allow the user to purchase at least one electronic postmark, or a plurality or block of electronic postmarks, wherein each electronic postmark comprises a unique identifier.

11. The system of claim 10, wherein the electronic postmark comprises an electronic postmark issued by at least one governmental postal authority or agency.

12. The systems of claim 1, wherein the electronic message comprises a ballot, survey, or poll and the recipient comprises an election official or an election authority.

13. The systems of claim 1, wherein the first electronic postmarking terminal comprises a location determination device, and wherein the computer executable instructions are operative to use the location determination device to determine and verify a location of the first electronic postmarking terminal, and if the electronic postmarking terminal is used to submit a ballot, then verify the legitimacy of the ballot.

14. A system comprising:

a first electronic postmarking module, wherein the first electronic postmarking module comprises:
a first processor;
a communications module connected to the first processor and operative to connect to a computer network; and
a user input device connected to the first processor; and
computer executable instructions readable by the first processor and operative to:
use the user input device to allow a user to log-in to the user's e-mail account or user account;
allow the user to add a recipient to a contact list, and if the recipient accepts the addition, then establish a unique encryption key for the user and recipient to use to decrypt messages sent between the user and recipient;
obtain or use a server to obtain at least one license, electronic postmark from a government postal authority, wherein the at least one license or electronic postmark may comprise a unique postal identifier;
use the user input device to allow the user to enter an electronic message or select an electronic message;
generate a first checksum based on the electronic message, and transmit the first checksum to the server;
encrypt the electronic message;
use the communications module to receive the unique postal identifier from the server and associate the unique postal identifier with the encrypted electronic message; and
use the communications module to transmit the encrypted electronic message to a recipient client via the computer network.

15. The system of claim 14, wherein the server comprises an electronic postmark server.

16. The system of claim 14, wherein the recipient client comprises a second processor and computer executable instructions readable by the second processor and operative to decrypt the encrypted electronic message, use a display device connected to the second processor to display the decrypted electronic message, generate a second checksum based on the decrypted electronic message, receive the first checksum from the server, compare the first checksum with the second checksum and if the first checksum and second checksum are different, then alert a user of the recipient client or transmit an alert to the server.

17. The system of claim 14, wherein the recipient client comprises a second processor and computer executable instructions readable by the second processor and operative to decrypt the encrypted electronic message, use a display device connected to the second processor to display the decrypted electronic message, generate a second checksum based on the decrypted electronic message, transmit the second checksum to the server, which compares the first checksum with the second checksum and if the first checksum and second checksum are different, then alert a user of the recipient client or transmit an alert to the server.

18. The system of claim 14, wherein the first electronic postmarking module comprises a document printer, wherein the computer executable instructions are operative to receive an encrypted electronic message, decrypt the encrypted electronic message or digital document, and use the document printer to print the electronic message.

19. The system of claim 14, wherein the computer executable instructions are operative to:
- allow the user to access the contact list, wherein the contact list is stored on the server;
- allow the user to select the recipient from the contact list;
- encrypt the electronic message or digital document using 256 bit encryption;
- set or trigger automatic deletion of the electronic message;
- prevent the forwarding of the electronic message;
- allow for the recall of the electronic message;
- block printing of the electronic message;
- use the communications module to connect to a POP or SMTP address or server associated with the user's e-mail account;
- divert non-encrypted received e-mail to a special folder;
- store the encrypted or non-encrypted electronic message on the server;
- operate a SMTP or POP server on the first electronic postmarking module;
- associate the unique postal identifier with the contents, subject, sender, recipient, attachments, time, date, or size of the electronic message or digital document;
- where the electronic message comprises a video, a presentation, an image animation, or a recording, then prevent the recipient from downloading or saving the electronic message, preventing the recipient from fast forwarding, pausing, rewinding, or replaying the electronic message; or
- where the electronic message comprises a video, a presentation, an image animation, or a recording, then display the electronic message in a window, or provide a user with a user interface to open or play the electronic message, wherein the user interface comprises at least one virtual input means, wherein the virtual input means comprises at least one virtual button.

20. The systems of claim 14, wherein the electronic message comprises a ballot, survey, or poll and the recipient client comprises an election official or an election authority.

21. The systems of claim 14, wherein the first electronic postmark module comprises a location determination device, and wherein the computer executable instructions are operative to use the location determination device to determine and verify a location of the first electronic postmarking module, and if the electronic postmarking module is used to submit a ballot, then verify the legitimacy of the ballot.

22. A method comprising:
- using a user input device to allow a user to log-in to an e-mail account or user account;
- allowing the user to add a recipient to a contact list stored on a server, and if the recipient accepts the addition, then establishing a unique encryption key for the user and recipient to use to decrypt messages sent between the user and recipient;
- obtaining or using the server to obtain at least one license, electronic postmark from a government postal authority, wherein the at least one license or electronic postmark may comprise a unique postal identifier;
- using the user input device to allow the user to enter an electronic message or select an electronic message;
- generating a first checksum based on the electronic message;
- transmitting the first checksum to a server;
- encrypting the electronic message;
- using a communications module to receive a unique postal identifier from a server and associate the unique postal identifier with the encrypted electronic message; and
- using a communications module to transmit the encrypted electronic message to a recipient client via a computer network.

\* \* \* \* \*